(12) United States Patent
Perrin et al.

(10) Patent No.: US 12,474,453 B2
(45) Date of Patent: Nov. 18, 2025

(54) CONTROL TECHNIQUES FOR PHOTODETECTOR SYSTEMS

(71) Applicant: ActLight SA, Lausanne (CH)

(72) Inventors: Lucas Perrin, Gland (CH); Denis Sallin, Echandens (CH); Maxim Gureev, St-Sulpice (CH); Serguei Okhonin, St-Sulpice (CH)

(73) Assignee: ActLight SA, Lausanne (CH)

( * ) Notice: Subject to any disclaimer, the term of this patent is extended or adjusted under 35 U.S.C. 154(b) by 948 days.

(21) Appl. No.: 17/580,052

(22) Filed: Jan. 20, 2022

(65) Prior Publication Data

US 2023/0228855 A1    Jul. 20, 2023

(51) Int. Cl.
| G01S 7/48 | (2006.01) |
| G01S 7/486 | (2020.01) |
| G01S 7/4863 | (2020.01) |
| G01S 17/10 | (2020.01) |
| G05B 19/042 | (2006.01) |

(52) U.S. Cl.
CPC .......... *G01S 7/4868* (2013.01); *G01S 7/4863* (2013.01); *G01S 17/10* (2013.01); *G05B 19/042* (2013.01); *G05B 2219/25124* (2013.01)

(58) Field of Classification Search
CPC ...... G01S 7/4868; G01S 7/4863; G01S 17/10; G05B 19/042; G05B 2219/25124
See application file for complete search history.

(56) References Cited

U.S. PATENT DOCUMENTS

| 4,202,000 A | 5/1980 | Carballes |
| 4,484,210 A | 11/1984 | Shiraki et al. |
| 4,833,346 A | 5/1989 | Marple |
| 6,808,957 B1 | 10/2004 | Ho et al. |
| 6,992,698 B1 | 1/2006 | Xia |
| 9,012,960 B2 | 4/2015 | Okhonin |
| 9,142,692 B2 | 9/2015 | Sheu |
| 9,236,520 B2 | 1/2016 | Okhonin et al. |
| 9,431,566 B2 | 8/2016 | Okhonin |

(Continued)

FOREIGN PATENT DOCUMENTS

| CN | 1815744 A | 8/2006 |
| CN | 101236995 A | 8/2008 |

(Continued)

OTHER PUBLICATIONS

Daniel van Nieuwenhove, et al, "Photonic Demodulator With Sensitivity Control," IEEE Sensors Journal, IEEE Service Center, vol. 7, No. 3, Mar. 1, 2007, pp. 317-318 (2 pages).

(Continued)

*Primary Examiner* — Tony Ko

(74) *Attorney, Agent, or Firm* — Wilmer Cutler Pickering Hale and Dorr LLP

(57) ABSTRACT

Techniques for controlling photodetector systems are disclosed. In one particular embodiment, the techniques may be realized as a system for controlling a photodetector. The system may comprise one or more processors and memory storing instructions that, when executed by the one or more processors, cause the system to: receive a target value; receive an output from the photodetector; generate, based at least on the target value, a bias signal; and apply the bias signal to the photodetector to drive a parameter of the photodetector to the target value.

23 Claims, 19 Drawing Sheets

(56) References Cited

U.S. PATENT DOCUMENTS

| | | |
|---|---|---|
| 9,735,304 B1 | 8/2017 | Okhonin et al. |
| 10,269,855 B2 | 4/2019 | Sallin et al. |
| 10,509,113 B2 | 12/2019 | Sallin et al. |
| 10,964,837 B2 | 3/2021 | Sallin et al. |
| 11,114,480 B2 | 9/2021 | Okhonin et al. |
| 11,183,524 B2 | 11/2021 | Sato |
| 11,251,217 B2 | 2/2022 | Okhonin et al. |
| 11,435,446 B2 * | 9/2022 | Hall ............... G01S 7/497 |
| 11,768,278 B2 * | 9/2023 | Jiang ............... G01S 17/42 356/5.01 |
| 2001/0017786 A1 | 8/2001 | Woodward |
| 2003/0001080 A1 | 1/2003 | Kummaraguntla et al. |
| 2003/0223053 A1 | 12/2003 | Liu et al. |
| 2006/0022223 A1 | 2/2006 | Kumesawa |
| 2006/0039666 A1 | 2/2006 | Knights et al. |
| 2008/0277701 A1 | 11/2008 | Lee et al. |
| 2010/0084729 A1 | 4/2010 | Steinbrueck et al. |
| 2010/0155806 A1 | 6/2010 | Fourches |
| 2010/0230720 A1 | 9/2010 | Wicks |
| 2010/0237455 A1 | 9/2010 | Lee |
| 2010/0271108 A1 | 10/2010 | Sanfilippo et al. |
| 2011/0024808 A1 | 2/2011 | Janesick |
| 2011/0133160 A1 | 6/2011 | Yu et al. |
| 2011/0220969 A1 | 9/2011 | Masuoka et al. |
| 2011/0272561 A1 | 11/2011 | Sanfilippo et al. |
| 2011/0292380 A1 | 12/2011 | Bamji |
| 2012/0056096 A1 | 3/2012 | Abeles et al. |
| 2012/0313155 A1 | 12/2012 | Okhonin |
| 2013/0056708 A1 | 3/2013 | Kim |
| 2013/0214355 A1 | 8/2013 | Fang et al. |
| 2013/0323873 A1 | 12/2013 | Elasser et al. |
| 2014/0159188 A1 | 6/2014 | Maimon |
| 2014/0319640 A1 | 10/2014 | Major et al. |
| 2015/0221806 A1 | 8/2015 | Okhonin |
| 2017/0365636 A1 | 12/2017 | Mazzillo et al. |
| 2018/0175095 A1 | 6/2018 | Sallin et al. |
| 2018/0247968 A1 | 8/2018 | Na et al. |
| 2019/0013427 A1 | 1/2019 | Ting et al. |
| 2019/0067357 A1 | 2/2019 | Cheng et al. |
| 2019/0252570 A1 | 8/2019 | Sallin et al. |
| 2020/0135776 A1 | 4/2020 | Finkelstein |
| 2020/0185560 A1 | 6/2020 | Giroud-Garampon et al. |

FOREIGN PATENT DOCUMENTS

| | | |
|---|---|---|
| CN | 102460763 A | 5/2012 |
| CN | 102891154 A | 1/2013 |
| CN | 102901992 A | 1/2013 |
| CN | 103515465 A | 1/2014 |
| CN | 105849908 A | 8/2016 |
| CN | 108140656 A | 6/2018 |
| CN | 109155325 A | 1/2019 |
| CN | 110416335 A | 11/2019 |
| EP | 2357669 A2 | 8/2011 |
| JP | H05-110056 A | 4/1993 |
| JP | H07-142761 A | 6/1995 |
| JP | H07-302928 A | 11/1995 |
| JP | H08-506456 A | 7/1996 |
| JP | H09-331051 | 12/1997 |
| JP | 2003-244074 A | 8/2003 |
| JP | 2005-235893 A | 9/2005 |
| JP | 2005-303268 A | 10/2005 |
| JP | 2005-347599 A | 12/2005 |
| JP | 2006-210919 | 8/2006 |
| JP | 2007-526448 A | 9/2007 |
| JP | 2011-007622 A | 1/2011 |
| JP | 2013/157619 A | 8/2013 |
| JP | 2016-066766 | 4/2016 |
| JP | 2018-088488 | 6/2018 |
| JP | 2018-190797 | 11/2018 |
| TW | 446196 U | 7/2001 |
| WO | WO-2004/114369 A2 | 12/2004 |
| WO | WO-2005/078801 | 8/2005 |
| WO | WO-2013/124956 A1 | 8/2013 |
| WO | WO-2014/021115 | 2/2014 |
| WO | WO-2018/160721 A1 | 9/2018 |
| WO | WO-2022/208167 A1 | 10/2022 |

OTHER PUBLICATIONS

Klein, P., et al., "Design and Performance of Semiconductor Detectors With Integrated Amplification and Charge Storage Capability," Nuclear Instruments & methods in Physics Research. Section A: Accelerators, Spectrometers, Detectors, and Associated Equipment, Elsevier BV, vol. A305, Aug. 1, 1991, pp. 517-526 (10 pages).

Sallin, Denis, et al., "MOS-PN Hybrid Device With Minimum Dark Current for Sensitive Digital Photdection," IEEE Photonics Technology Letters, IEEE Service Center, vol. 26, No. 20, Oct. 15, 2014, pp. 2062-2065 (4 pages).

Notification of International Search Report and Written Opinion dated Jun. 28, 2018, in related PCT/IB2018/000356 filed Mar. 16, 2018 (19 pages).

Notice of Reasons for Rejection received in related Japanese Patent Application No. 2016-547246 mailed May 8, 2018 (6 pages).

Salman, et al., "Field Effect Diode (FED): A Novel Device for ESD protection in deep sub-micron SOI technologies," Electron Devices Meeting, 2006, IEDM '06 International, pp. 1-4 (4 pages).

Raissi et al., "A brief analysis of the field effect diode and breakdown transistor," IEEE Transactions on Electron Devices, vol. 43, Issue 2, pp. 362-365 (4 pages).

Cova, et al., "Avalanche Photodiodes and Quenching Circuits for Single-Photon Detection," Applied Optics, Optical Society of America, Washington, DC, US, vol. 35, No. 12, Apr. 20, 1996, pp. 1956-1976 (21 pages).

Fossum, et al., "A Review of the Pinned Photodiode for CCD and CMOS Image Sensors," IEEE Journal of the Electron Devices Society, vol. 2, No. 3, pp. 33-43, May 2014.

Takahashi, et al., "A 45 nm Stacked CMOS Image Sensor Process Technology for Submicron Pixel," Article, Sensors, MDPI, www.mdpi.com/journal/sensors, pp. 1-13, Basel, Switzerland, Dec. 5, 2017.

Notification of International Search Report and Written Opinion dated Aug. 5, 2022, in related PCT/IB2022/000164 filed Mar. 29, 2022 (11 pages).

* cited by examiner

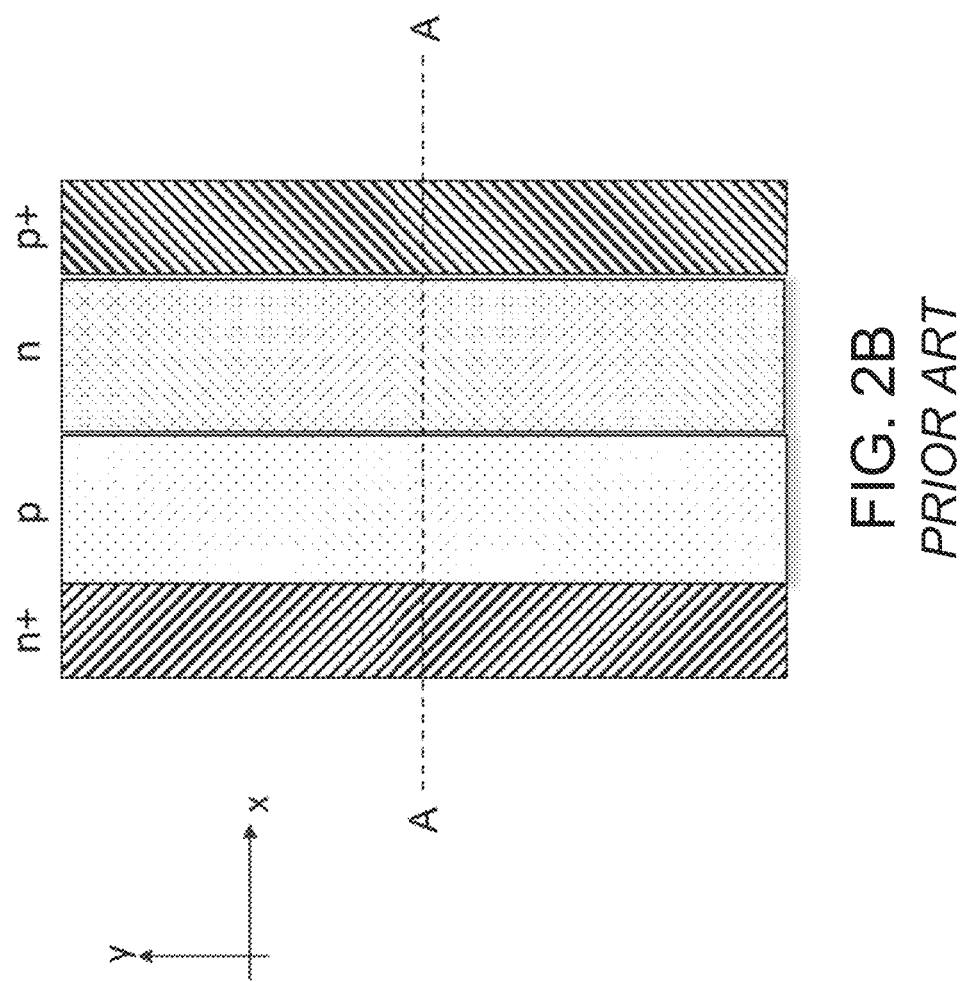

CONTROL TECHNIQUES FOR PHOTODETECTOR SYSTEMS

RELATED APPLICATIONS

This patent application incorporates by reference U.S. Pat. No. 9,012,960 (the '960 patent), entitled "Photodetector and Methods of Manufacturing and Operating Same," filed May 28, 2012, and U.S. patent application Ser. No. 17/100,339, entitled "Photodetector," filed on Nov. 20, 2020 (the '339 application). Notably, the present disclosure may describe one or more embodiments in view of the photodetector layouts/architectures of the '960 patent and the '339 application.

FIELD OF THE DISCLOSURE

The present disclosure relates generally to photodetectors and, more particularly, to control techniques for photodetector systems.

BACKGROUND OF THE DISCLOSURE

A traditional pn or pin photodetector may be operated by being held at a bias voltage. Incident photons are absorbed in a light absorbing region to generate electron-hole pairs, which are swept to contacts. The magnitude of the photocurrent is proportional to the intensity of the light incident on the photodetector.

A non-traditional type of photodetector is disclosed in the '960 patent that operates using pulsed voltages that are switched from reverse bias to forward bias. Switching to forward bias induces a current to flow across the device structure. However, the onset of the flow of current is not instantaneous, but rather occurs after a time delay from the onset of the light incidence. This time delay is referred to as the triggering time. The triggering time is proportional to the inverse of the light intensity. Thus, triggering time may be used as the measure of the intensity of the incident light.

FIGS. 1A and 1B are schematic representations in section and plan view, respectively, of a photodetector as disclosed in the '960 patent. The growth direction of the layers of the photodetector is marked as the z-direction, which is orthogonal to the plane of the wafer. First and second gates, Gate 1 and Gate 2, extend in the y-direction. The direction orthogonal to the gates, in which the electrons and holes are swept out, is the x-direction. FIG. 1A, in the xz-plane, corresponds to a section AA as indicated in FIG. 1B. Gate 1 and Gate 2 are arranged on either side of a light absorbing region, which forms part of a body region. The body region may be an intrinsic or a doped semiconductor such as silicon or germanium suitable for absorbing incoming photons of the wavelength range to be detected. Highly doped n+ and p+ regions are arranged on either side of the body region beyond the gates and serve as outputs for reading out the photocurrent. The layers of the photodetector may be epitaxially fabricated on a semiconductor-on-insulator (SOI) substrate. The gates may be made of a conductive material (metal or semiconductor). The gates may be spaced from the body region via an insulator or dielectric material (silicon oxide or silicon nitride).

The photodetector of FIGS. 1A and 1B may be operated with the following bias voltages. A negative voltage $V_{G1}$ may be applied to Gate 1 (for example, −2V), a negative or zero voltage $V_1$ may be applied to the n+ region, a positive voltage $V_{G2}$ may be applied to Gate 2 (for example, 2V) and a positive voltage $V_2$ (for example, 1V) may be applied to the p+ region. The triggering time of the photodetector is a function of the electric field in the body region and is hence tunable by adjusting the gate voltages. Under bias conditions, photons incident onto the light absorbing region between the gates, e.g., from a fiber optic device, are absorbed and thereby generate electron-hole pairs, which are then swept out by the electric field induced by the bias voltages and detected as current flowing between the n+ and p+ regions.

FIGS. 2A and 2B are schematic representations in section and plan view, respectively, of a photodetector as disclosed in the '339 application. The growth direction of the layers of the photodetector is marked as the z-direction, which is orthogonal to the plane of the wafer. First and second contact regions, which are respectively semiconductor regions doped n+ and p+, extend in the y-direction. FIG. 2A, in the xz-plane, corresponds to a section AA as indicated in FIG. 2B. The contact regions are arranged on either side of a body region, which is formed in two parts, namely a p-doped semiconductor sub-region adjacent the n+ contact region, and an n-doped semiconductor region adjacent the p+ contact region. The n-type and p-type subregions have a common interface where they meet. In the x-direction, the structure thus has the sequence in the x-direction of: n+-p-n-p+. The body sub-regions may be made of a suitable semiconductor material such as silicon or germanium or silicon carbide, or suitable alloy thereof, where the band gap is chosen to be suitable for absorbing incoming photons of the wavelength range to be detected. Highly doped n+ and p+ regions are arranged either side of the body region and serve as outputs for reading out the photocurrent. The layers of the photodetector may be epitaxially fabricated on a semiconductor-on-insulator (SOI) substrate.

The photodetector of FIGS. 2A and 2B may be operated with the following bias voltages. A negative or zero voltage $V_1$ (for example, 0 or −1V) may be applied to the n+ region and a positive voltage $V_2$ (for example, +1V) may be applied to the p+ region. The n- and p-type sub-regions of the body region are unbiased. The triggering time of the photodetector is a function of the electric field in the body region and is hence tunable by adjusting the bias voltages $V_1$ and $V_2$. Under bias conditions, photons incident onto the light absorbing region, e.g., from a fiber optic device, are absorbed and thereby generate electron-hole pairs, which are then swept out by the electric field induced by the bias voltages and detected as current flowing between the n+ and p+ regions.

FIGS. 3A, 3B, and 3C are exemplary energy band diagrams along the x-direction of the photodetector of FIGS. 2A and 2B, as disclosed in the '339 application. FIG. 3A shows the photodetector in reverse bias. FIGS. 3B and 3C both show the photodetector in forward bias with a bias voltage $V_{bias}=V_2-V_1$. FIG. 3B shows a condition when no light is incident, resulting in the structure being in a non-conducting state, and FIG. 3C shows a condition when light is incident, resulting in the structure being in a conducting state. In forward bias, when the sensor does not detect any light, little to no current flows between the p+ and n+ regions due to the barrier provided or caused by the bias voltage $V_{bias}=V_2-V_1$. However, when the sensor detects light, the incident photons are absorbed to generate electron-hole pairs and the sensor changes to a conducting state. Namely, under the electric field generated by the bias voltage, the holes move towards the n+ contact region, and the electrons move towards the p+ contact region. The migrated holes accumulate in the part of the p-region adjacent the n+ contact region and induce a lowering of the potential barrier to electron movement and electron current flow from the n+ region. Similarly, the migrated electrons accumulate in the part of the n-region adjacent the p+ contact region and induce a lowering of the hole barrier and hole current flowing from the p+ region. In its conductive state, the photodetector provides a large internal current gain. In addition, a positive feedback mechanism accelerates accumulation of excess positive and negative carriers adjacent the respective n+ and p+ contact regions, which, in turn, reduce the potential barriers corresponding to such regions and cause a current to flow between the p+ and n+ regions of the photodetector and an output current upon detecting or in response to the incident light. The number of electrons that accumulate before triggering the current flow may be referred to as $N_{tot}$ herein.

FIG. 4 is a schematic graph showing an exemplary output current of a photodetector such as the photodetector of FIGS. 2A and 2B, for example. The output current is illustrated as a function of bias voltage $V_{bias}=V_2-V_1$ between the n+ and p+ contact regions when incident light is detected ("ON") and when no light is detected ("OFF"), corresponding to the conducting and non-conducting states of FIGS. 3C and 3B, respectively. It is noted that above a threshold bias voltage Vth, the output current in the conducting state is more or less static with varying bias voltage. This is a preferred operating regime given that incident light intensity is measured by triggering time, rather than the magnitude of the photocurrent.

FIGS. 5A and 5B shows an oscilloscope screen shot of bias voltage $V_{bias}=V_2-V_1$ and output current I without and with light, respectively, as disclosed in the '339 application. Triggering time t decreases with increase in light intensity. FIG. 5A shows a triggering time of $t_0=5.5$ µs with no light. FIG. 5B shows a triggering time of $t_1=1.5$ µs with light at an absorbed power of 35 nW. Switching from a low current state to a high current state occurs very abruptly, which is favorable for precise measurements of delay time. The output current of 0.8 mA is more than four orders higher than an output current that could be achieved with a conventional photodiode at an absorbed power of 35 nW.

FIG. 6 is a graph plotting reciprocal triggering time as a function of absorbed light power for a photodetector, as disclosed in the '339 application. As can be seen, there is a linear relationship between the inverse of triggering time and absorbed light power. In other words, there is an inverse relationship between triggering time and absorbed light power. Thus, triggering time may be used as the measure of the intensity of the incident light.

FIG. 7 illustrates a photodetector array comprising a two-dimensional (2D) array of photodetectors as disclosed in the '339 application. The array may include, in addition to the array of photodetectors, control circuitry to manage the acquisition, capture and/or sensing operations of the photodetectors of the array. The control circuitry may be coupled to each of the photodetectors in the array. The control circuitry may transmit one or more control signals to the photodetectors in the array. The control circuitry may transmit one control signal to all the photodetectors. Alternatively, the control circuitry may transmit a plurality of control signals, each to a corresponding photodetector in the array. For example, the control circuitry (which may be integrated on the same substrate as the photodetectors) may control or enable/disable the photodetectors in a manner so that data acquisition or sensing correlates to the data rate of the transmission. The photodetector array may be coupled to a plurality of fiber optic output devices wherein each fiber optic device may be associated with one or more photodetectors of the array and the control circuitry may control or enable/disable the subset of photodetectors in accordance with the associated output of the fiber optic device.

The photodetector array may be formed from a plurality of discrete devices and/or from a plurality of photodetectors integrated on a die wherein the photodetector array portion includes a plurality of photodetectors to acquire, capture, convert and/or sense the incident light from one or more associated fiber optic output(s). The photodetectors may be configured and/or arranged in any array architecture as well as in conjunction with any type of integrated circuitry. Further, any manufacturing technique may be employed to fabricate the array, which includes a plurality of photodetectors.

SUMMARY OF THE DISCLOSURE

Techniques for controlling photodetector systems are disclosed. In one particular embodiment, the techniques may be realized as a system for controlling a photodetector. The system may comprise one or more processors and memory storing instructions that, when executed by the one or more processors, cause the system to receive a target value, receive an output from the photodetector, generate, based at least on the target value, a bias signal, and apply the bias signal to the photodetector to drive a parameter of the photodetector to the target value.

In accordance with other aspects of this particular embodiment, the instructions, when executed by the one or more processors, may further cause the system to calculate, based on the output, a signal-to-noise ratio associated with the photodetector, and generate the bias signal based at least on the target value and the signal-to-noise ratio.

In accordance with other aspects of this particular embodiment, the instructions, when executed by the one or more processors, may further cause the system to calculate, based on the output, a signal-to-noise ratio associated with the photodetector, and generate the bias signal based at least on the target value, the output, and the signal-to-noise ratio.

In accordance with other aspects of this particular embodiment, the instructions, when executed by the one or more processors, may further cause the system to calculate, based on the output, a distance of an object from the photodetector, and generate the bias signal based at least on the target value, the output, the signal-to-noise ratio, and the distance.

In accordance with other aspects of this particular embodiment, the instructions, when executed by the one or more processors, may further cause the system to, receive a power level of a light source, wherein the light source may be configured to emit a pulse of light, and the photodetector may be configured to detect a reflection of the pulse of light, and generate the bias signal based at least on the target value, the output, the signal-to-noise ratio, the distance, and the power level.

In accordance with other aspects of this particular embodiment, the output may be a triggering time of the photodetector.

In accordance with other aspects of this particular embodiment, the parameter may be one of a triggering time, a signal-to-noise ratio, or a contrast level.

In another particular embodiment, the techniques may be realized as a method for controlling a photodetector. The method may comprise receiving, by a system comprising memory and one or more processors, a target value, receiving, by the system, an output from the photodetector, generating, by the system and based at least on the target value, a bias signal, and applying, by the system, the bias signal to the photodetector to drive a parameter of the photodetector to the target value.

In accordance with other aspects of this particular embodiment, the method may further comprise calculating, by the system and based on the output, a signal-to-noise ratio associated with the photodetector, and generating, by the system and based at least on the target value and the signal-to-noise ratio, the bias signal.

In accordance with other aspects of this particular embodiment, the method may further comprise calculating, by the system and based on the output, a signal-to-noise ratio associated with the photodetector, and generating, by the system and based at least on the target value, the output, and the signal-to-noise ratio, the bias signal.

In accordance with other aspects of this particular embodiment, the method may further comprise calculating, by the system and based on the output, a distance of an object from the photodetector, and generating, by the system and based at least on the target value, the output, the signal-to-noise ratio, and the distance, the bias signal.

In accordance with other aspects of this particular embodiment, the method may further comprise receiving, by the system, a power level of a light source, wherein the light source may be configured to emit a pulse of light, and the photodetector may be configured to detect a reflection of the pulse of light, and generating, by the system and based at least on the target value, the output, the signal-to-noise ratio, the distance, and the power level, the bias signal.

In accordance with other aspects of this particular embodiment, the output may be a triggering time of the photodetector.

In accordance with other aspects of this particular embodiment, the parameter may be one of a triggering time, a signal-to-noise ratio, or a contrast level.

In another particular embodiment, the techniques may be realized as one or more non-transitory computer-readable media storing executable instructions that, when executed by one or more processors, may cause a system to receive a target value, receive an output from the photodetector, generate, based at least on the target value, a bias signal, and apply the bias signal to the photodetector to drive a parameter of the photodetector to the target value.

In accordance with other aspects of this particular embodiment, the executable instructions, when executed by the one or more processors, may further cause the system to calculate, based on the output, a signal-to-noise ratio associated with the photodetector, and generate the bias signal based at least on the target value and the signal-to-noise ratio.

In accordance with other aspects of this particular embodiment, the executable instructions, when executed by the one or more processors, may further cause the system to calculate, based on the output, a signal-to-noise ratio associated with the photodetector, and generate the bias signal based at least on the target value, the output, and the signal-to-noise ratio.

In accordance with other aspects of this particular embodiment, the executable instructions, when executed by the one or more processors, may further cause the system to calculate, based on the output, a distance of an object from the photodetector, and generate the bias signal based at least on the target value, the output, the signal-to-noise ratio, and the distance.

In accordance with other aspects of this particular embodiment, the executable instructions, when executed by the one or more processors, may further cause the system to receive a power level of a light source, wherein the light source may be configured to emit a pulse of light, and the photodetector may be configured to detect a reflection of the pulse of light, and generate the bias signal based at least on the target value, the output, the signal-to-noise ratio, the distance, and the power level.

In accordance with other aspects of this particular embodiment, the output may be a triggering time of the photodetector.

In accordance with other aspects of this particular embodiment, the parameter may be one of a triggering time, a signal-to-noise ratio, or a contrast level.

In another particular embodiment, the techniques may be realized as a system for controlling a plurality of photodetectors. The system may comprise one or more processors and memory storing instructions that, when executed by the one or more processors, cause the system to receive a matrix of target coefficients, receive a plurality of outputs, each from a photodetector of the plurality of photodetectors, generate, based at least on the matrix of target coefficients and the plurality of outputs, a plurality of bias signals, and apply each of the plurality of bias signals to a corresponding photodetector of the plurality of photodetectors to drive a parameter of the corresponding photodetector to a target value.

In another particular embodiment, the techniques may be realized as a system for controlling a plurality of photodetectors. The system may comprise one or more processors, and memory storing instructions that, when executed by the one or more processors, cause the system to receive a vector of target coefficients, receive a plurality of outputs, each from a photodetector of the plurality of photodetectors, generate, based at least on the vector of target coefficients and the plurality of outputs, a bias signal, and apply the bias signal to each of the plurality of photodetectors to drive a parameter of each of the plurality of photodetectors to a target value.

BRIEF DESCRIPTION OF THE DRAWINGS

In the course of the detailed description to follow, reference will be made to the attached drawings. These drawings show different aspects of the present disclosure and, where appropriate, reference numerals illustrating like structures, components, materials and/or elements in different figures are labeled similarly. It should be understood that various combinations of the structures, components, and/or elements, other than those specifically shown, are contemplated and are within the scope of the present disclosure.

The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein. Notably, an embodiment or implementation described herein as exemplary should not to be construed as preferred or advantageous, for example, over other embodiments or implementations; rather, it is intended reflect or indicate the embodiment or embodiments as an example embodiment(s).

FIGS. 2A and 2B are schematic representations in section and plan view respectively of a photodetector as disclosed in the '339 application.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details. The disclosed embodiments may employ any photodetector or array of photodetectors to implement the present disclosure, including the photodetector layouts/architectures of the '960 patent and the '339 application.

Figure 8:
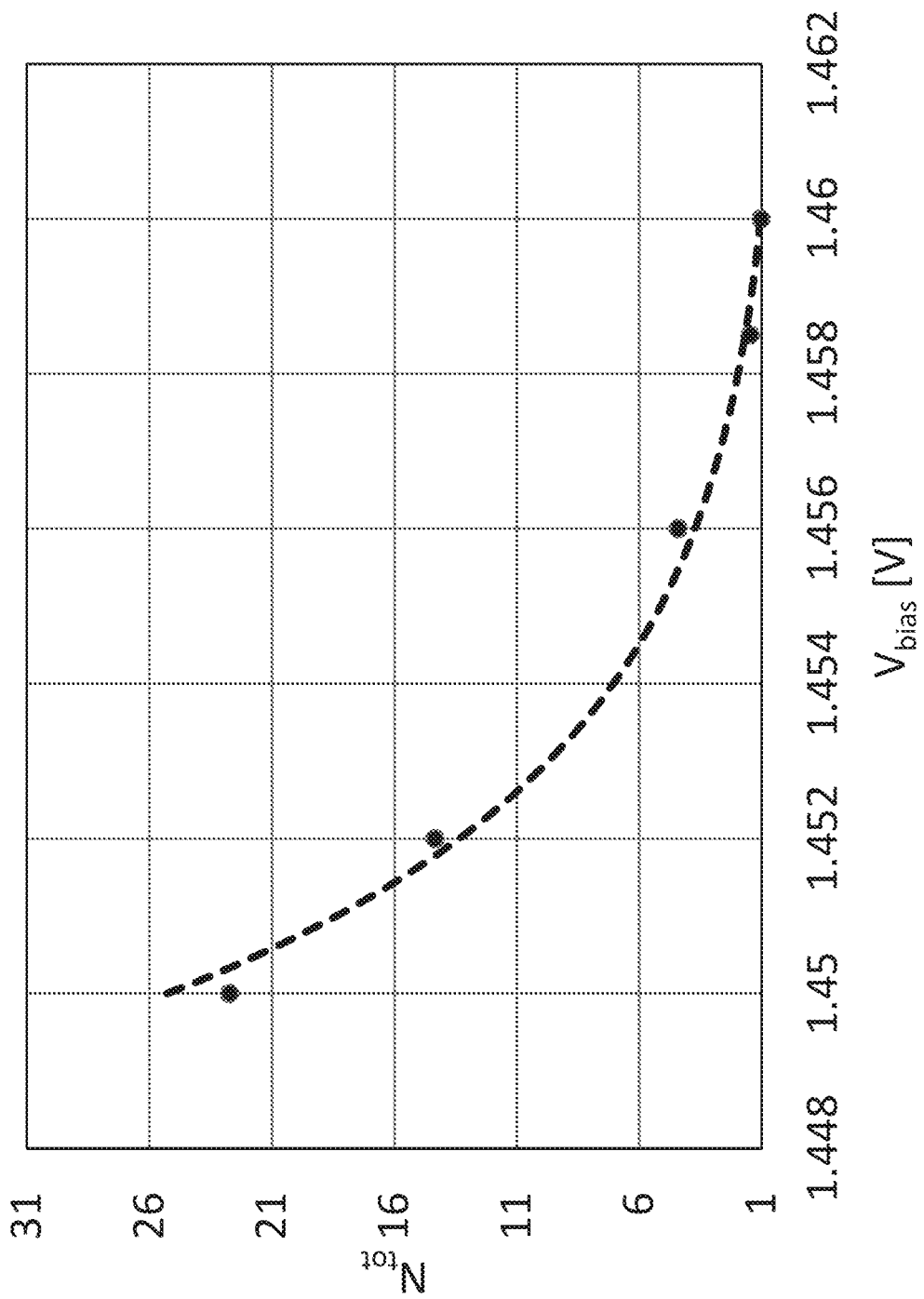
FIG. 8 is graph plotting number of electrons as a function of bias voltage for an exemplary photodetector at a fixed incident light intensity, according to an embodiment of the present disclosure.

As discussed in the Background, when a photodetector is activated at a bias voltage $V_{bias}$, there is an inverse relationship between triggering time and absorbed light power, wherein triggering time may be used as the measure of the intensity of the incident light. The triggering time is the time it takes to accumulate a number $N_{tot}$ of electrons that is needed to trigger the current flow. On the other hand, for a fixed incident light intensity, changing the bias voltage $V_{bias}$ changes the number $N_{tot}$ of electrons needed to trigger the photocurrent in a photodetector. For example, FIG. 8 is graph plotting the number $N_{tot}$ of electrons as a function of the bias voltage $V_{bias}$ for an exemplary photodetector at a fixed incident light intensity, according to an embodiment of the present disclosure. As can be seen from FIG. 8, increasing the bias voltage $V_{bias}$ decreases the number $N_{tot}$ of electrons. Conversely, decreasing the bias voltage $V_{bias}$ increases the number $N_{tot}$ of electrons. With the understanding that increasing and decreasing the bias voltage $V_{bias}$ respectively decreases and increases the number $N_{tot}$ of electrons, a control system may be devised to control, tune, adjust, and/or program a parameter of a photodetector to a target value.

Figure 9:
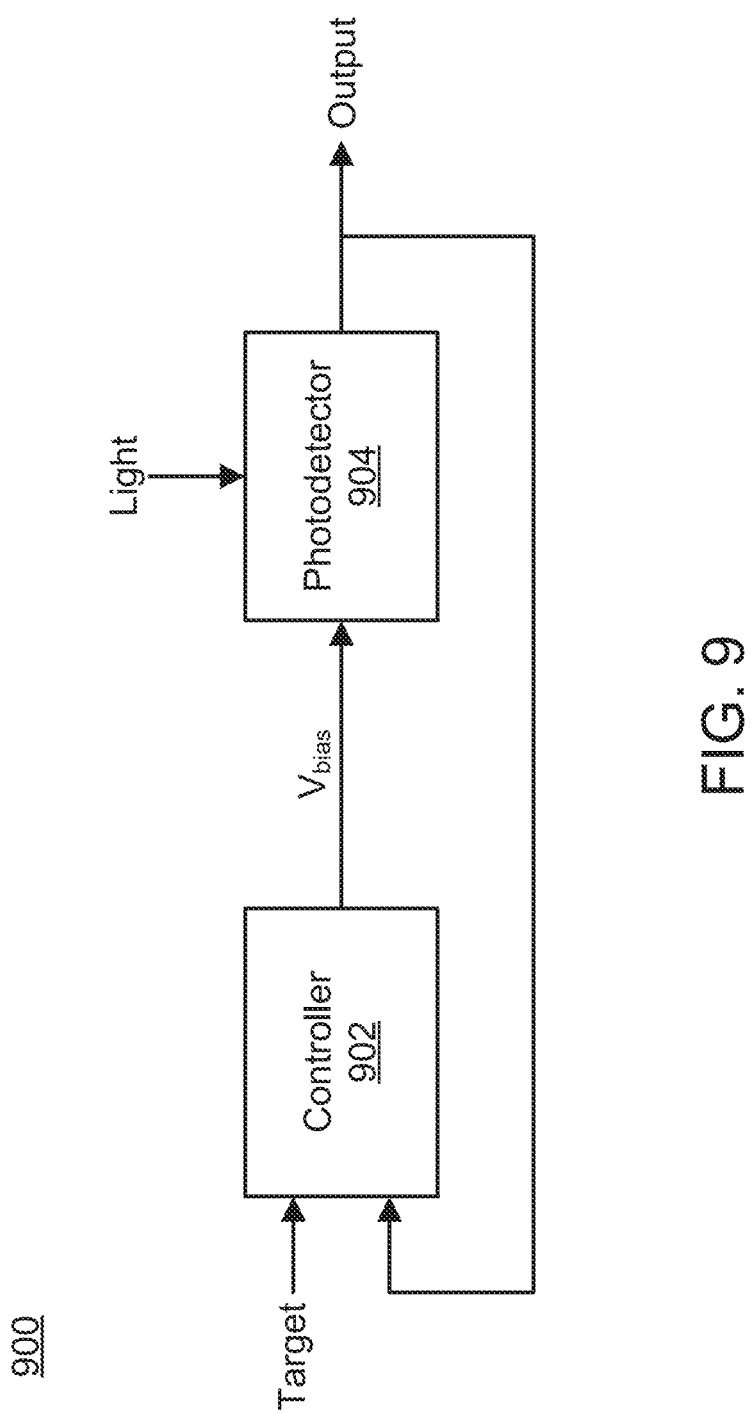
FIG. 9 shows a control system architecture for controlling, tuning, adjusting, and/or programming a parameter corresponding to a photodetector, according to an embodiment of the present disclosure.

FIG. 9 shows a control system architecture 900 for controlling, tuning, adjusting, and/or programming a parameter corresponding to a photodetector, according to an embodiment of the present disclosure. Control system architecture 900 may include a controller 902 and a photodetector 904. Controller 902 may be formed by one or more microcontrollers, processors, or microprocessors. Controller 902 may include one or more memory devices such as dynamic random access memory (DRAM), static random access memory (SRAM), flash memory, a magnetic disk drive, an optical drive, a programmable read only memory (PROM), a read only memory (ROM), or any other memory and combination of memories. The one or more microcontrollers, processors, or microprocessors may implement algorithms, instructions, and/or programs that are stored on the one or more of the memory devices in order to perform the various processes of the present disclosure. Controller 902 may send and receive various signals to and from photodetector 904. Photodetector 904 may be any photodetector, including any of the photodetectors disclosed in the '960 patent and the '339 application.

Controller 902 may receive, as inputs, an output related to a characteristic of photodetector 904 and a target value. The target value may be predetermined and set at a fixed value by an operator of the control system. Alternatively, the target value may be dynamically and/or automatically varied during the operation of photodetector 904. The target value may be the value at which a parameter of photodetector 904 may be desired to be set at a given moment in time. In some embodiments, the target value may be desired independently of the light condition (e.g., light intensity) under which photodetector 904 operates. The output related to a characteristic of photodetector 904 may be measured directly from photodetector 904 or from other parameters of photodetector 904. Alternatively, the output related to a characteristic of photodetector 904 may be calculated based on other parameters of photodetector 904.

Controller 902 may generate (or compute or formulate) and output and/or apply a bias voltage $V_{bias}$ to photodetector 904. The bias voltage $V_{bias}$ may forward bias photodetector 904. Alternatively, controller 902 may output a bias current to forward bias photodetector 904 or a bias signal to a driver (not shown) that in turn forward biases photodetector 904. Based on the target value and the output related to photodetector 904, controller 902 may, continuously or at predetermined time intervals, vary the bias voltage $V_{bias}$ (or bias current or bias signal) such that and until the parameter of photodetector 904 reaches the target value. Examples of parameters of a photodetector that may be controlled, tuned, adjusted, and/or programmed are, but are not limited to, triggering time, signal-to-noise ratio (SNR), and contrast level (e.g., in time-of-flight (ToF) systems, proximity or gesture sensors, vital sign monitors, etc.).

The triggering time of a photodetector may be controllable, tunable, adjustable, and/or programmable, for example, to meet or accommodate response time specifications as well as power consumption specification for the photodetector. In an embodiment, the voltages applied to the n+ region and p+ region (effectively, the bias voltage $V_{bias}=V_2-V_1$) may be adjusted to decrease or increase the triggering time of the photodetector—for example, by respectively increasing or decreasing the electric field within the body region, or by respectively decreasing or increasing the number $N_{tot}$ of electrons in the body region (see, e.g., FIG. 8). In another embodiment, the voltages applied to the n+ region and p+ region (effectively, the bias voltage $V_{bias}=V_2-V_1$) may be adjusted to reduce the power consumption of the photodetector. Thus, the response time and/or power consumption may be controlled, tuned, adjusted, and/or programmed to, for example, accommodate desired/required specifications of the photodetector. All permutations of response time and/or power consumption, and combinations of thereof, are intended to fall within the scope of the present disclosure.

Figure 10:
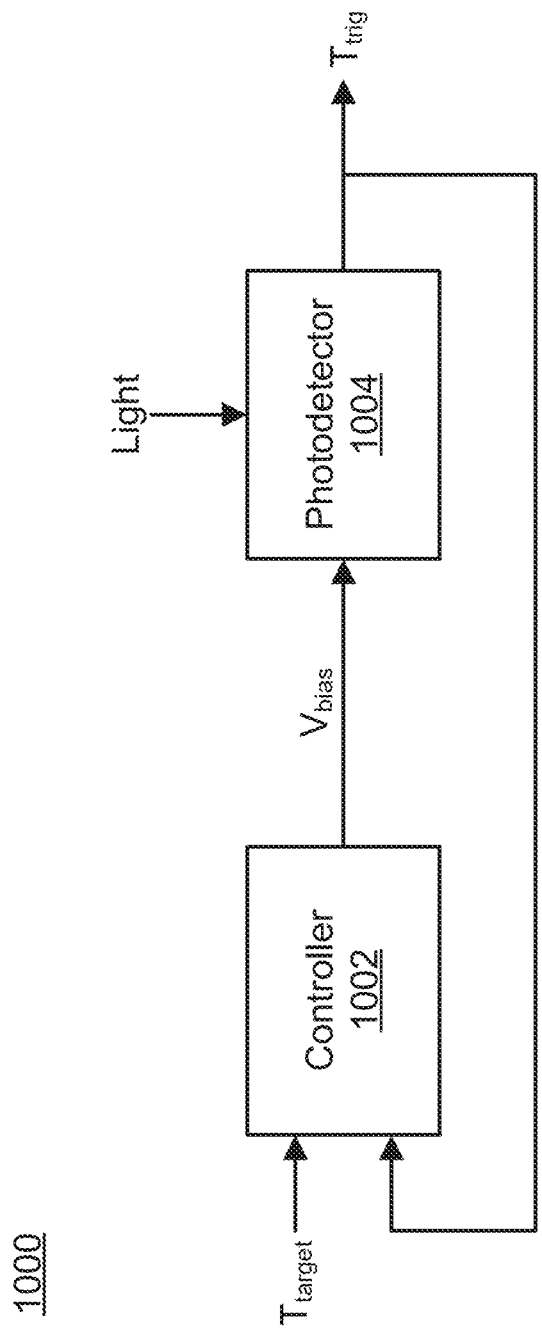
FIG. 10 illustrates a control system for controlling, tuning, adjusting, and/or programming the triggering time of a photodetector, according to an embodiment of the present disclosure.

FIG. 10 illustrates a control system 1000 for controlling, tuning, adjusting, and/or programming the triggering time of a photodetector, according to an embodiment of the present disclosure. Control system 1000 may include a controller 1002 and a photodetector 1004. Controller 1002 may be formed by one or more microcontrollers, processors, or microprocessors. Controller 1002 may include one or more memory devices such as DRAM, SRAM, flash memory, a magnetic disk drive, an optical drive, a PROM, a ROM, or any other memory and combination of memories. The one or more microcontrollers, processors, or microprocessors may implement algorithms, instructions, and/or programs that are stored on the one or more of the memory devices in order to perform the various processes of the present disclosure. Controller 1002 may send and receive various signals to and from photodetector 1004. Photodetector 1004 may be any photodetector, including any of the photodetectors disclosed in the '960 patent and the '339 application.

Figure 6:
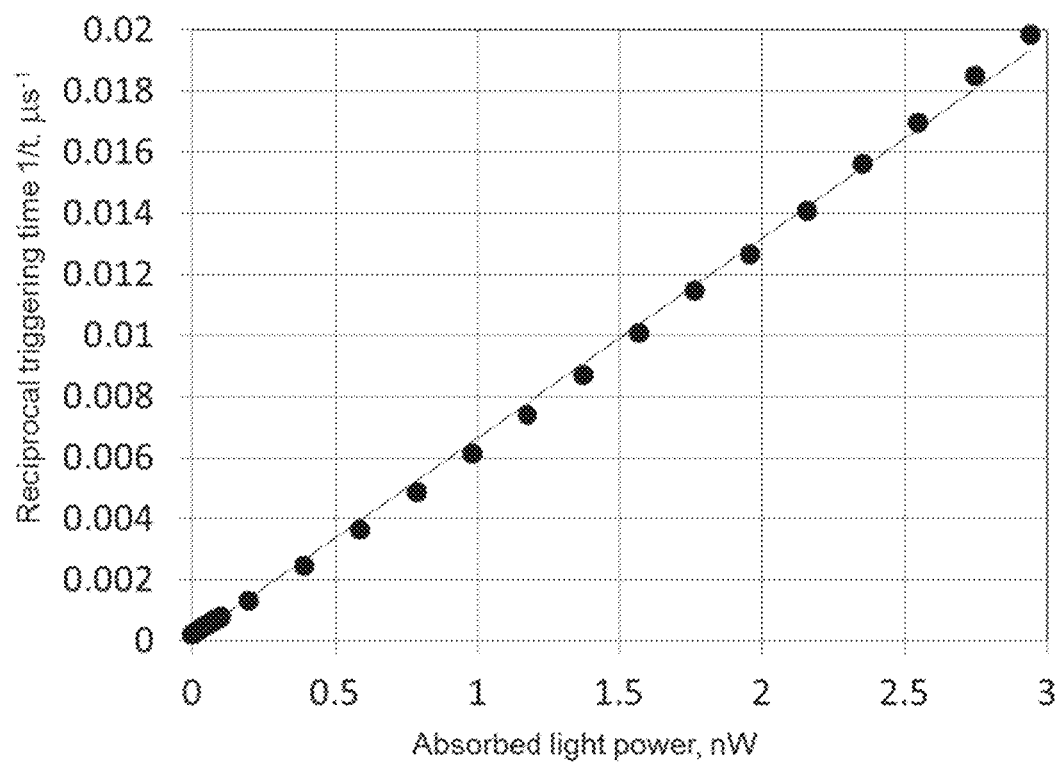
FIG. 6 is a graph plotting reciprocal triggering time of a photodetector as a function of absorbed light power, as disclosed in the '339 application.

Controller 1002 may receive, as inputs, a measured or calculated triggering time $T_{trig}$ of photodetector 1004 and a target triggering time $T_{target}$. The target triggering time $T_{target}$ may be predetermined and set at a fixed value by an operator of control system 1000. Alternatively, the target triggering time $T_{target}$ may be dynamically and/or automatically varied during the operation of photodetector 1004. A target triggering time $T_{target}$ may be desired independently of the light condition (e.g., light intensity) under which photodetector 1004 is operating. The light condition may depend on background light and/or light provided by an active illuminator. For example, regardless of the light condition—e.g., low, high, or varying light intensity—, it may be desirable for the photodetector 1004 to trigger at a set triggering time $T_{target}$. Given that the triggering time $T_{trig}$ of photodetector 1004 is inversely proportional to the light intensity to which it is exposed (see, e.g., FIG. 6), when the light intensity increases or decreases, the triggering time $T_{trig}$ will tend to decrease or increase, respectively. Under such conditions, to maintain the triggering time $T_{trig}$ at a set triggering time $T_{target}$, controller 1002 may be configured to decrease or increase the bias voltage $V_{bias}$ (=$V_2-V_1$), respectively. Decreasing or increasing the bias voltage $V_{bias}$ respectively increases or decreases the number $N_{tot}$ of electrons in the body region of photodetector 1004 needed to trigger a photocurrent (see, e.g., FIG. 8), thereby respectively increasing or decreasing the triggering time $T_{trig}$.

Controller 1002 may generate (or compute or formulate) and output a bias voltage $V_{bias}$ accordingly to photodetector 1004. The bias voltage $V_{bias}$ may forward bias photodetector 1004. Alternatively, controller 1002 may output a bias current to forward bias photodetector 1004 or a bias signal to a driver (not shown) that in turn forward biases photodetector 1004. Based on the target value and the measured or calculated triggering time $T_{trig}$ of photodetector 1004, controller 1002 may, continuously or at predetermined time intervals, vary the bias voltage $V_{bias}$ (or bias current or bias signal) such that the triggering time $T_{trig}$ is driven to a set triggering time $T_{target}$.

Figure 11:
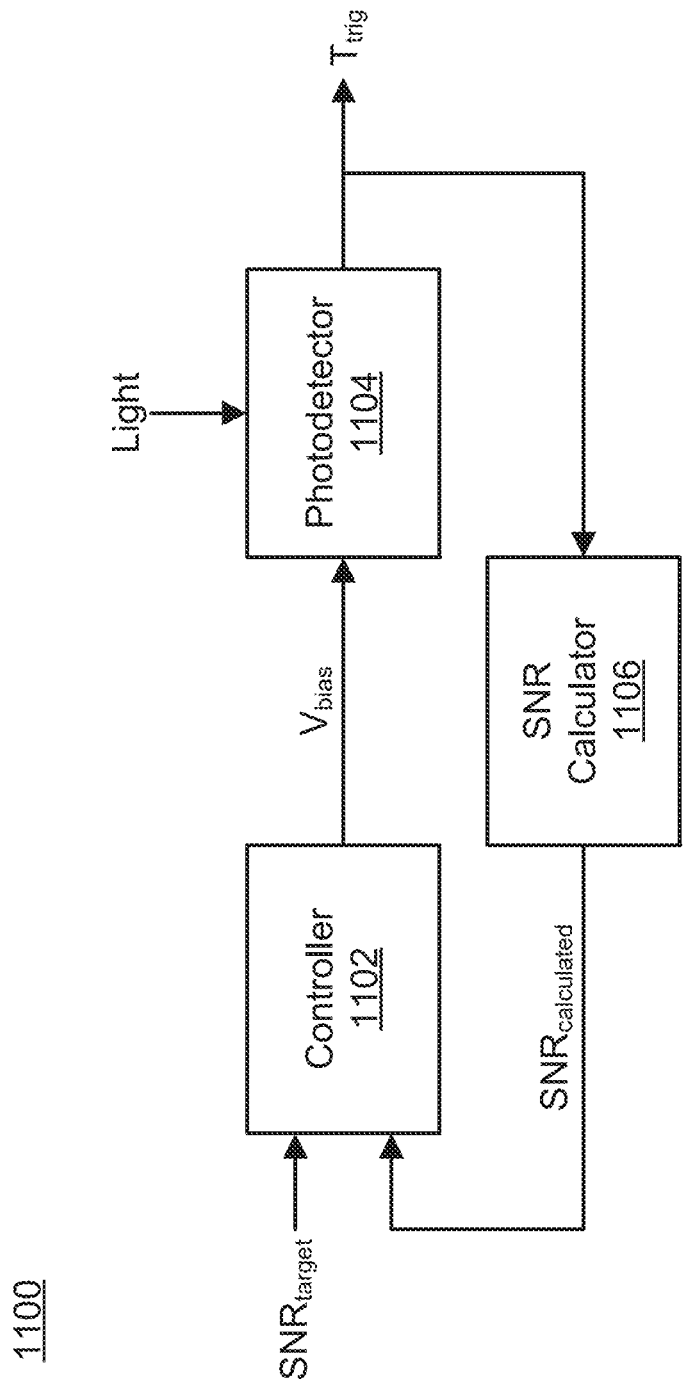
FIG. 11 illustrates a control system for controlling, tuning, adjusting, and/or programming the signal-to-noise ratio of a photodetector, according to an embodiment of the present disclosure.

FIG. 11 illustrates a control system 1100 for controlling, tuning, adjusting, and/or programming the SNR of a photodetector, according to an embodiment of the present disclosure. Control system 1100 may include a controller 1102, a photodetector 1104, and an SNR calculator 1106. Controller 1102 and SNR calculator 1106, each separately or both in combination, may be formed by one or more microcontrollers, processors, or microprocessors. Controller 1102 and SNR calculator 1106, each separately or both in combination, may include one or more memory devices such as DRAM, SRAM, flash memory, a magnetic disk drive, an optical drive, a PROM, a ROM, or any other memory and combination of memories. The one or more microcontrollers, processors, or microprocessors may implement algorithms, instructions, and/or programs that are stored on the one or more of the memory devices in order to perform the various processes of the present disclosure. Photodetector 1104 may be any photodetector, including any of the photodetectors disclosed in the '960 patent and the '339 application.

SNR calculator 1106 may receive, as input, a measured or calculated triggering time $T_{trig}$ of photodetector 1104. Based on the triggering time $T_{trig}$, SNR calculator 1106 may be configured to calculate or compute $SNR_{calculated}$ corresponding to photodetector 1104 and representing the SNR of photodetector 1104. For example, the SNR calculator 1106 may be configured to calculate or compute the average p and the standard deviation a of the triggering time $T_{trig}$, and then calculate or compute $SNR_{calculated}$ as p/a (i.e., p divided by a). Controller 1102 may receive, as inputs, a target SNR ($SNR_{target}$) and $SNR_{calculated}$. $SNR_{target}$ may be predetermined and set at a fixed value by an operator of control system 1100. Alternatively, $SNR_{target}$ may be dynamically and/or automatically varied during the operation of photodetector 1104.

Based on $SNR_{target}$ and $SNR_{calculated}$, controller 1102 may generate (or compute or formulate) and output a bias voltage $V_{bias}$ to photodetector 1104. The bias voltage $V_{bias}$ may forward bias photodetector 1104. Alternatively, controller 1102 may output a bias current to forward bias photodetector 1104 or a bias signal to a driver (not shown) that in turn forward biases photodetector 1104. Based on $SNR_{target}$ and $SNR_{calculated}$, controller 1102 may, continuously or at predetermined time intervals, vary the bias voltage $V_{bias}$ (or bias current or bias signal) such that the SNR of the photodetector 1104 is driven to $SNR_{target}$. By controlling, tuning, adjusting, and/or programming the SNR of photodetector 1104, controller 1102 effectively controls, tunes, adjusts, and/or programs the sensitivity of photodetector 1104.

Figure 12:
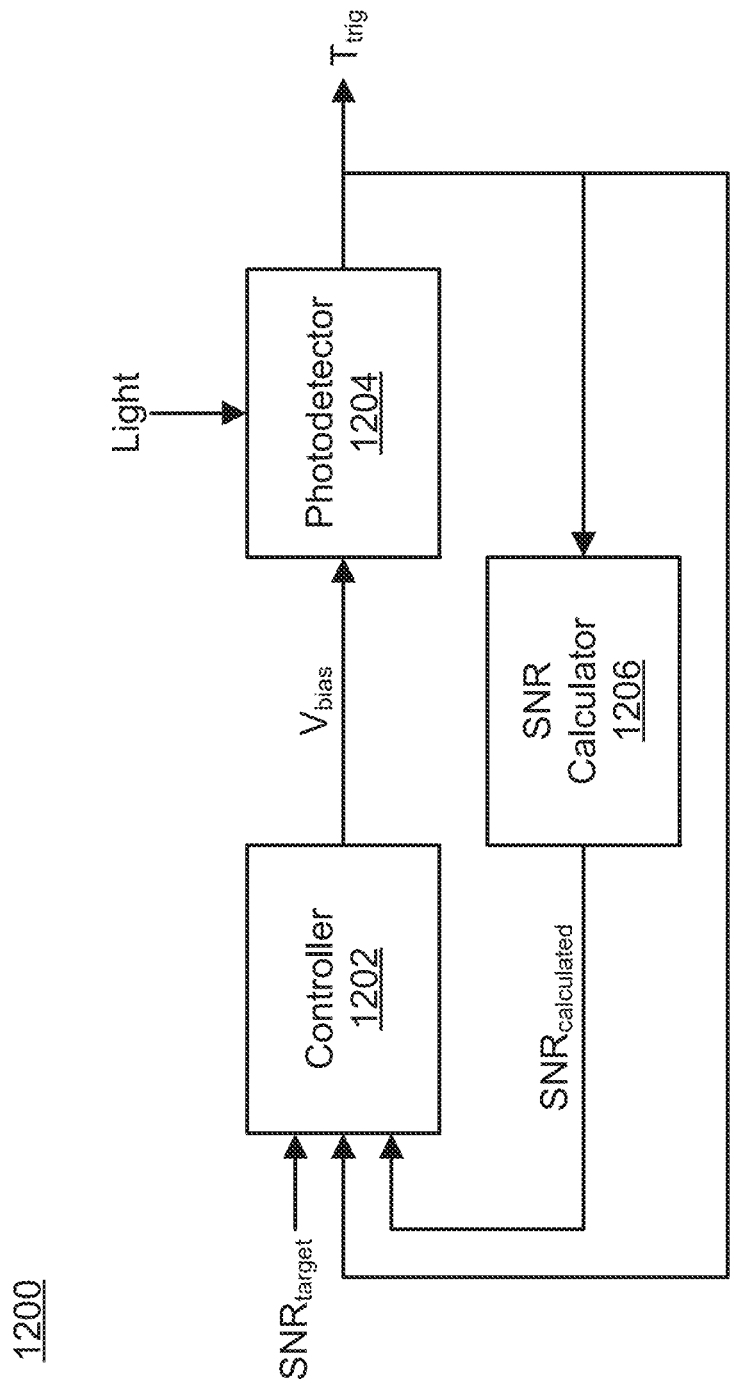
FIG. 12 illustrates a control system for controlling, tuning, adjusting, and/or programming the signal-to-noise ratio of a photodetector, according to an embodiment of the present disclosure.

FIG. 12 illustrates a control system 1200 for controlling, tuning, adjusting, and/or programming the SNR of a photodetector, according to an embodiment of the present disclosure. Control system 1200 may include a controller 1202, a photodetector 1204, and an SNR calculator 1206. Controller 1202 and SNR calculator 1206, each separately or both in combination, may be formed by one or more microcontrollers, processors, or microprocessors. Controller 1202 and SNR calculator 1206, each separately or both in combination, may include one or more memory devices such as DRAM, SRAM, flash memory, a magnetic disk drive, an optical drive, a PROM, a ROM, or any other memory and combination of memories. The one or more microcontrollers, processors, or microprocessors may implement algorithms, instructions, and/or programs that are stored on the one or more of the memory devices in order to perform the various processes of the present disclosure. Photodetector 1204 may be any photodetector, including any of the photodetectors disclosed in the '960 patent and the '339 application.

SNR calculator 1206 may receive, as input, a measured or calculated triggering time $T_{trig}$ of photodetector 1204. Based on the triggering time $T_{trig}$, SNR calculator 1206 may be configured to calculate or compute $SNR_{calculated}$ corresponding to photodetector 1204 and representing the SNR of photodetector 1204. Controller 1202 may receive, as inputs, a target SNR ($SNR_{target}$), $SNR_{calculated}$, and the measured or calculated triggering time $T_{trig}$ of photodetector 1204. $SNR_{target}$ may be predetermined and set at a fixed value by an operator of control system 1200. Alternatively, $SNR_{target}$ may be dynamically and/or automatically varied during the operation of photodetector 1204.

Based on $SNR_{target}$, $SNR_{calculated}$, and triggering time $T_{trig}$, controller 1202 may generate (or compute or formulate) and output a bias voltage $V_{bias}$ to photodetector 1204. The bias voltage $V_{bias}$ may forward bias photodetector 1204. Alternatively, controller 1202 may output a bias current to forward bias photodetector 1204 or a bias signal to a driver (not shown) that in turn forward biases photodetector 1204. Based on $SNR_{target}$, $SNR_{calculated}$, and triggering time $T_{trig}$, controller 1202 may, continuously or at predetermined time intervals, vary the bias voltage $V_{bias}$ (or bias current or bias signal) such that the SNR of the photodetector 1204 is driven to $SNR_{target}$, independently of light condition (e.g., low, high, or varying light intensity of background light and/or light provided by an active illuminator). By controlling, tuning, adjusting, and/or programming the SNR of photodetector 1204, controller 1202 effectively controls, tunes, adjusts, and/or programs the sensitivity of photodetector 1204.

In some embodiments, there may exist an optimum number $N_{tot}$ of electrons that optimizes the performance of a photodetector. For example, in a time-of-flight (ToF) system that uses a photodetector, there may exist an optimum number $N_{tot}$ of electrons that minimizes the noise on the distance measurement for a given light condition.

Figure 13:
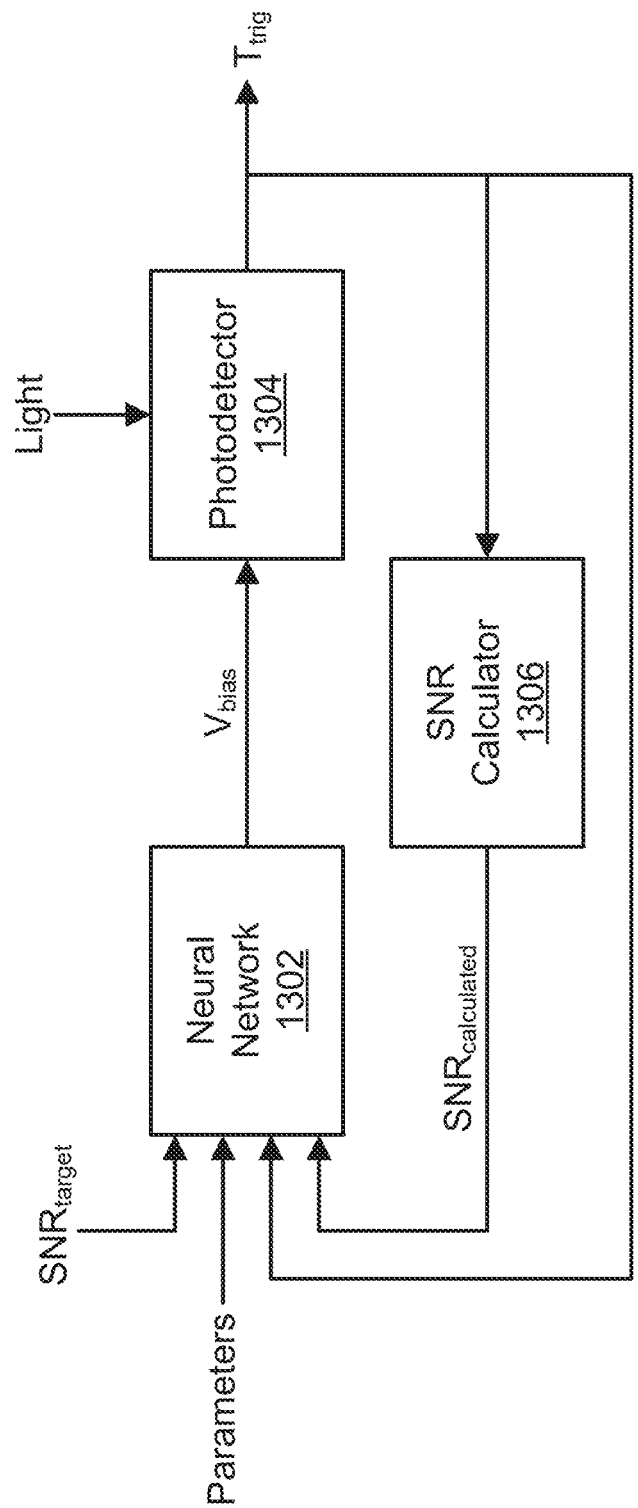
FIG. 13 illustrates a neural network system for controlling, tuning, adjusting, and/or programming the signal-to-noise ratio of a photodetector while optimizing the number of electrons needed to generate a photocurrent in the photodetector, according to an embodiment of the present disclosure.

FIG. 13 illustrates a neural network system 1300 for controlling, tuning, adjusting, and/or programming the signal-to-noise ratio of a photodetector while optimizing the number $N_{tot}$ of electrons needed to generate a photocurrent in the photodetector, according to an embodiment of the present disclosure. Neural network system 1300 may include a neural network 1302, a photodetector 1304, and an SNR calculator 1306. Neural network 1302 and SNR calculator 1306, each separately or both in combination, may be formed by one or more microcontrollers, processors, or microprocessors. Neural network 1302 and SNR calculator 1306, each separately or both in combination, may include one or more memory devices such as DRAM, SRAM, flash memory, a magnetic disk drive, an optical drive, a PROM, a ROM, or any other memory and combination of memories. The one or more microcontrollers, processors, or microprocessors may implement algorithms, instructions, and/or programs that are stored on the one or more of the memory devices in order to perform the various processes of the present disclosure. Photodetector 1304 may be any photodetector, including any of the photodetectors disclosed in the '960 patent and the '339 application.

SNR calculator 1306 may receive, as input, a measured or calculated triggering time $T_{trig}$ of photodetector 1304. Based on the triggering time $T_{trig}$, SNR calculator 1306 may be configured to calculate or compute $SNR_{calculated}$ corresponding to photodetector 1304 and representing the SNR of photodetector 1304. Neural network 1302 may receive, as inputs, a target SNR ($SNR_{target}$), $SNR_{caculated}$, the measured or calculated triggering time $T_{trig}$ of photodetector 1304, and one or more additional parameters such as internal settings (e.g., light source power, light source pulse width, etc.) of the neural network system 1300 and/or external conditions (e.g., reflected light power, background light intensity, extracted distance, etc.). $SNR_{target}$ may be predetermined and set at a fixed value by an operator of control system 1300. Alternatively, $SNR_{target}$ may be dynamically and/or automatically varied during the operation of photodetector 1304.

Based on $SNR_{target}$, $SNR_{calculated}$, triggering time $T_{trig}$, and the one or more additional parameters, neural network 1302 may generate (or compute or formulate) and output a bias voltage $V_{bias}$ to photodetector 1304. For example, the neural network 1302 may be trained and configured to select an optimum bias voltage $V_{bias}$ to achieve the target SNR ($SNR_{target}$) according to $SNR_{calculated}$, triggering time $T_{trig}$, and the one or more additional parameters. The one or more additional parameters may correspond to one or more environmental conditions. The bias voltage $V_{bias}$ may forward bias photodetector 1304. Alternatively, controller 1302 may output a bias current to forward bias photodetector 1304 or a bias signal to a driver (not shown) that in turn forward biases photodetector 1304. Based on $SNR_{target}$, $SNR_{calculated}$, triggering time $T_{trig}$, and the one or more additional parameters, neural network 1302 may, continuously or at predetermined time intervals, vary the bias voltage $V_{bias}$ (or bias current or bias signal) such that the SNR of the photodetector 1304 is driven to $SNR_{target}$, while optimizing the number $N_{tot}$ of electrons needed to generate a photocurrent in the photodetector 1304.

Figure 14:
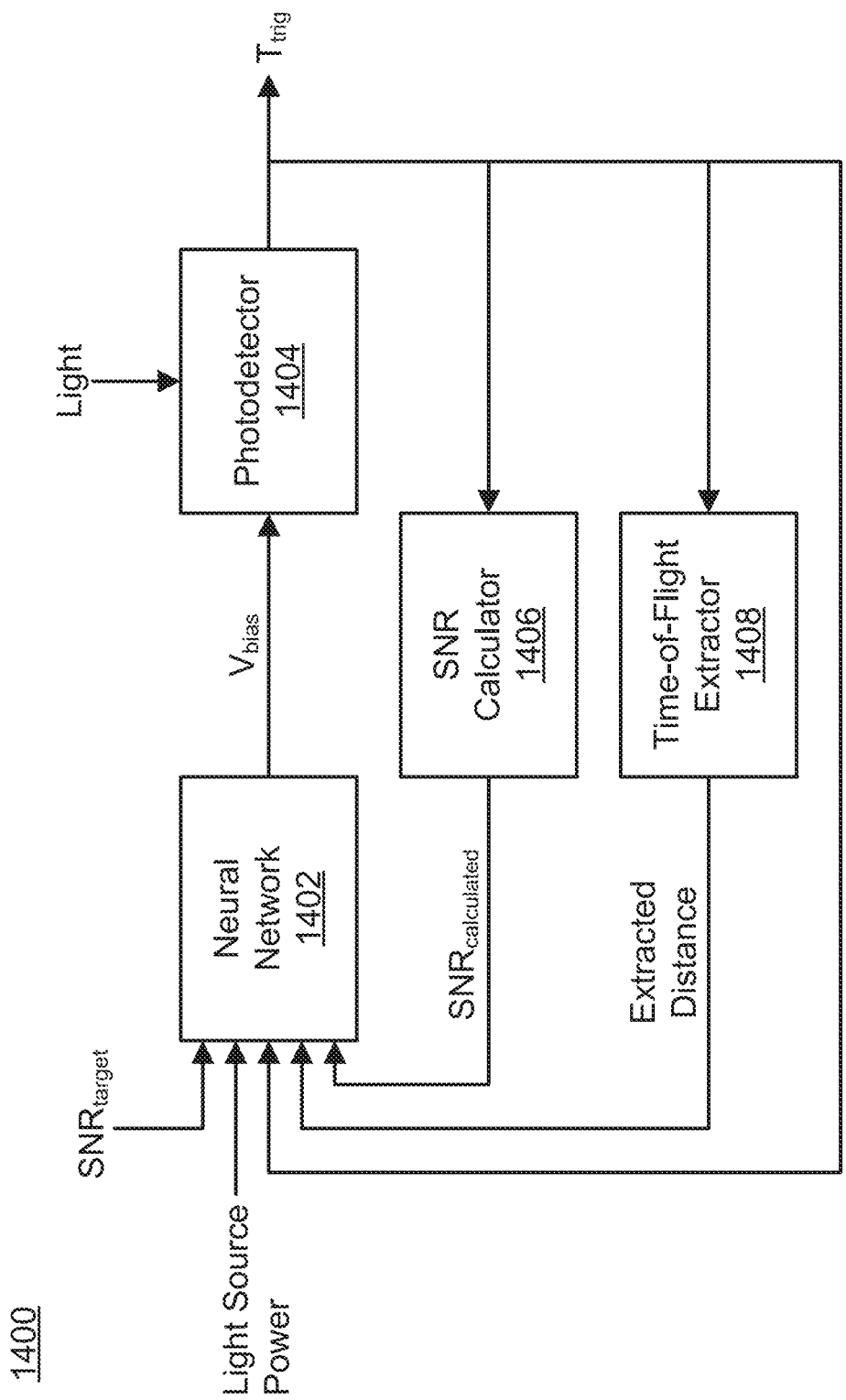
FIG. 14 illustrates a neural network system for controlling, tuning, adjusting, and/or programming the signal-to-noise ratio of a photodetector while minimizing noise on extracted distance by optimizing the number of electrons needed to generate a photocurrent in the photodetector, according to an embodiment of the present disclosure.

FIG. 14 illustrates a neural network system 1400 for controlling, tuning, adjusting, and/or programming the signal-to-noise ratio of a photodetector while minimizing noise on extracted distance by optimizing the number $N_{tot}$ of electrons needed to generate a photocurrent in the photodetector, according to an embodiment of the present disclosure. Neural network system 1400 may include a neural network 1402, a photodetector 1404, an SNR calculator 1406, and a time-of-flight (ToF) extractor 1408. Neural network 1402, SNR calculator 1406, and ToF extractor 1408, each separately or both in combination, may be formed by one or more microcontrollers, processors, or microprocessors. Neural network 1402, SNR calculator 1406, and ToF extractor 1408, each separately or both in combination, may include one or more memory devices such as DRAM, SRAM, flash memory, a magnetic disk drive, an optical drive, a PROM, a ROM, or any other memory and combination of memories. The one or more microcontrollers, processors, or microprocessors may implement algorithms, instructions, and/or programs that are stored on the one or more of the memory devices in order to perform the various processes of the present disclosure. Photodetector 1404 may be any photodetector, including any of the photodetectors disclosed in the '960 patent and the '339 application.

SNR calculator 1406 and ToF extractor 1408 may each receive, as input, a measured or calculated triggering time $T_{trig}$ of photodetector 1404. Based on the triggering time $T_{trig}$, SNR calculator 1406 may be configured to calculate or compute $SNR_{calculated}$ corresponding to photodetector 1404 and representing the SNR of photodetector 1404. Based on the triggering time $T_{trig}$, the ToF extractor 1408 may extract, calculate, or compute a distance (e.g., of an object in the surrounding of the neural network system 1400). See, e.g., U.S. Pat. No. 10,509,113. Neural network 1402 may receive, as inputs, a target SNR ($SNR_{target}$), $SNR_{calculated}$, the extracted distance from ToF extractor 1408, the measured or calculated triggering time $T_{trig}$ of photodetector 1404, and the power of the light source that emits light that in turn gets reflected and detected by photodetector 1404. $SNR_{target}$ may be predetermined and set at a fixed value by an operator of control system 1400. Alternatively, $SNR_{target}$ may be dynamically and/or automatically varied during the operation of photodetector 1404.

Based on $SNR_{target}$, $SNR_{caculated}$, the extracted distance, triggering time $T_{trig}$, and the power of the light source, neural network 1402 may generate (or compute or formulate) and output a bias voltage $V_{bias}$ to photodetector 1404. The bias voltage $V_{bias}$ may forward bias photodetector 1404. Alternatively, controller 1402 may output a bias current to forward bias photodetector 1404 or a bias signal to a driver (not shown) that in turn forward biases photodetector 1404. Based on $SNR_{target}$, $SNR_{caculated}$, the extracted distance, triggering time $T_{trig}$, and the power of the light source, neural network 1402 may, continuously or at predetermined time intervals, vary the bias voltage $V_{bias}$ (or bias current or bias signal) such that the SNR of the photodetector 1404 is driven to $SNR_{target}$, while minimizing the noise on the extracted distance by optimizing the number $N_{tot}$ of electrons needed to generate a photocurrent in the photodetector 1404.

Figure 15:
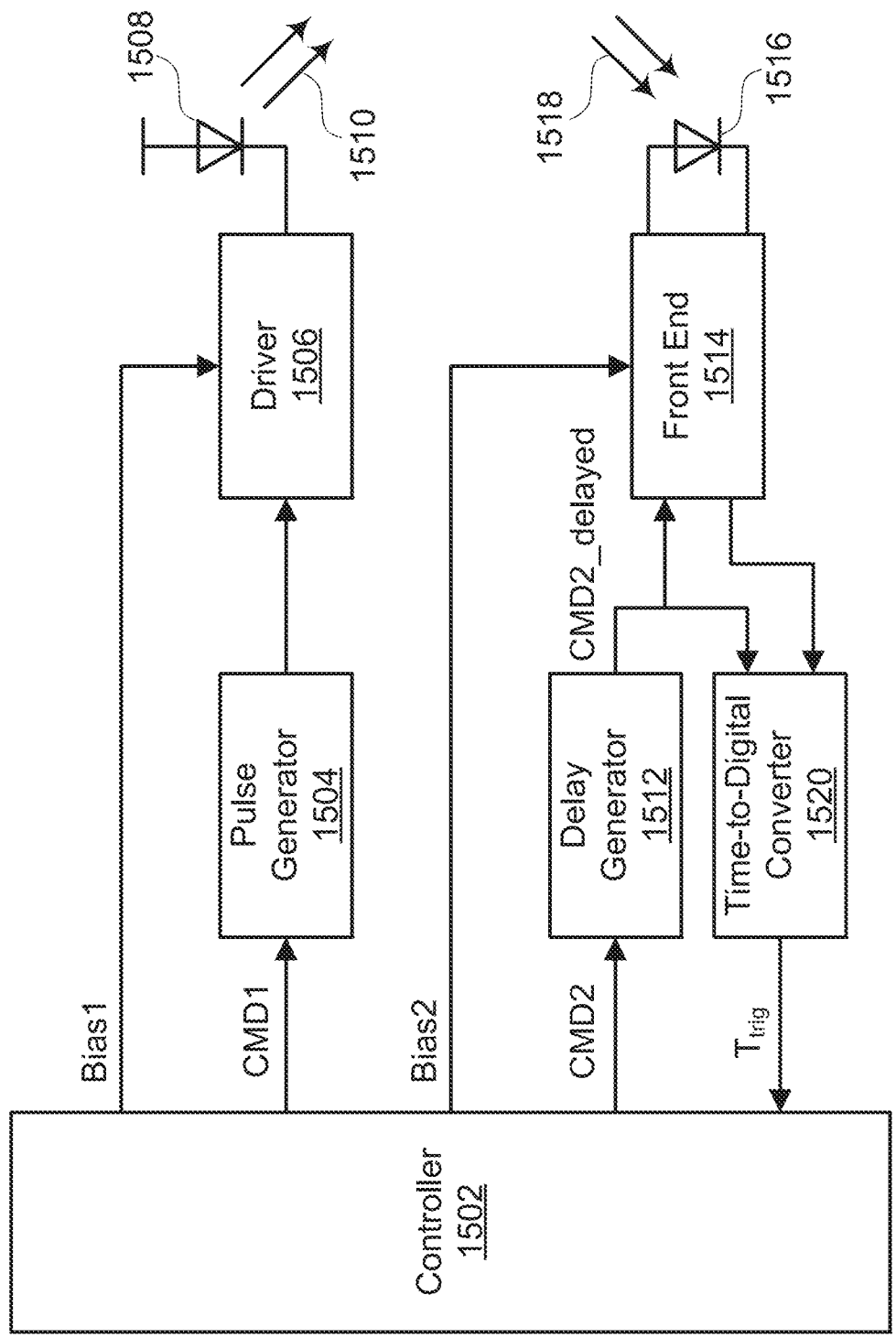
FIG. 15 shows a time-of-flight system according to an embodiment of the present disclosure.

FIG. 15 shows a time-of-flight (ToF) system 1500 according to an embodiment of the present disclosure. ToF system 1500 includes a controller 1502. Controller 1502 may be formed by one or more microcontrollers, processors, or microprocessors. Controller 1502 may include one or more memory devices such as DRAM, SRAM, flash memory, a magnetic disk drive, an optical drive, a PROM, a ROM, or any other memory and combination of memories. The one or more microcontrollers, processors, or microprocessors may implement algorithms, instructions, and/or programs that are stored on the one or more of the memory devices in order to perform the various processes of the present disclosure. Controller 1502 may send and receive various signals from components in ToF system 1500. Moreover, the functionality of the various components shown in FIG. 15 may be embodied in one or more processors that execute instructions to provide such functionality and are stored in one or more memory devices.

As shown in FIG. 15, controller 1502 may send a command signal CMD1 to pulse generator 1504. Command signal CMD1 may specify information about how light should be emitted by a light source 1508 in ToF system 1500. For example, CMD1 may specify the pulse width and/or pulse magnitude of a light pulse emitted by light source 1508. CMD1 may specify the pulse width and/or pulse magnitude for a plurality of pulses or for a single pulse.

Pulse generator 1504 may receive CMD1 from controller 1502 and may determine the kind of light pulse that should be emitted by light source 1508. For example, pulse generator 1504 may determine the pulse width and/or pulse magnitude from CMD1. Based on this determination, pulse generator 1504 may send light pulse parameters to driver 1506. Driver 1506 may also receive a bias signal Bias1 from controller 1502. The bias signal Bias1 may set the peak power of light source 1508, for example, by setting the amplitude of the pulse emitted by light source 1508. Based on the light pulse parameters from pulse generator 1504 and the bias signal Bias1, driver 1506 may then drive light source 1508 to output a light pulse 1510. Light pulse 1510 may be output and may reflect off of one or more objects in an environment to generate incident light 1518.

Light source 1508 may be a laser that emits an infrared (IR) light pulse. Alternatively, light source 1508 may be a light source device that emits light other than IR light pulses. For example, light source 1508 may be a laser device that emits light pulses featuring wavelengths from parts of the light spectrum other than the infrared wavelength range. Light source 1508 may be a light source that is capable of generating short, medium, and long pulses of light. Light source 1508 may emit visible or non-visible light.

At the same time or substantially the same time that controller 1502 sends CMD1 to pulse generator 1504, controller 1502 may send command signal CMD2 to delay generator 1512. Delay generator 1512 may be programmable. CMD2 may specify when a bias voltage should be provided to photodetector 1516. Therefore, CMD2 may specify when photodetector 1516 should be forward biased and placed in active mode to sense incident light 1518. Photodetector 1516 may be any photodetector, including any of the photodetectors disclosed in the '960 patent and the '339 application.

Programmable delay generator 1512 may receive CMD2 and determine the amount of time (t) after light is emitted from light source 1508 to delay forwarding CMD2 to front end 1514. Programmable delay generator 1512 may output a delayed CMD2 (e.g., CMD2_delayed) to front end 1514. Programmable delay generator 1512 may also output CMD2_delayed to time to digital converter (TDC) 1520.

Figure 1A:
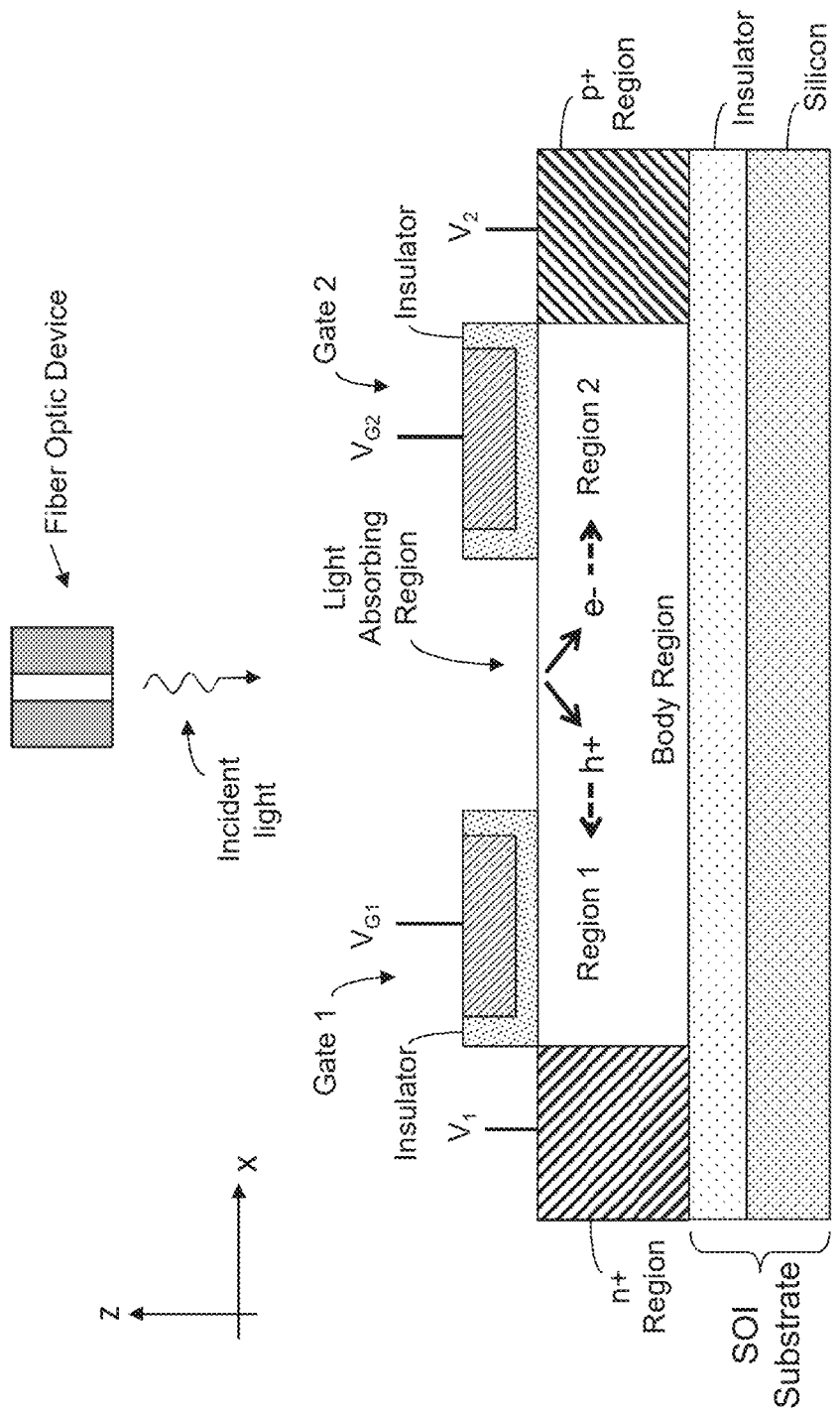
FIGS. 1A and 1B are schematic representations in section and plan view respectively of a photodetector as disclosed in the '960 patent.
Figure 1B:
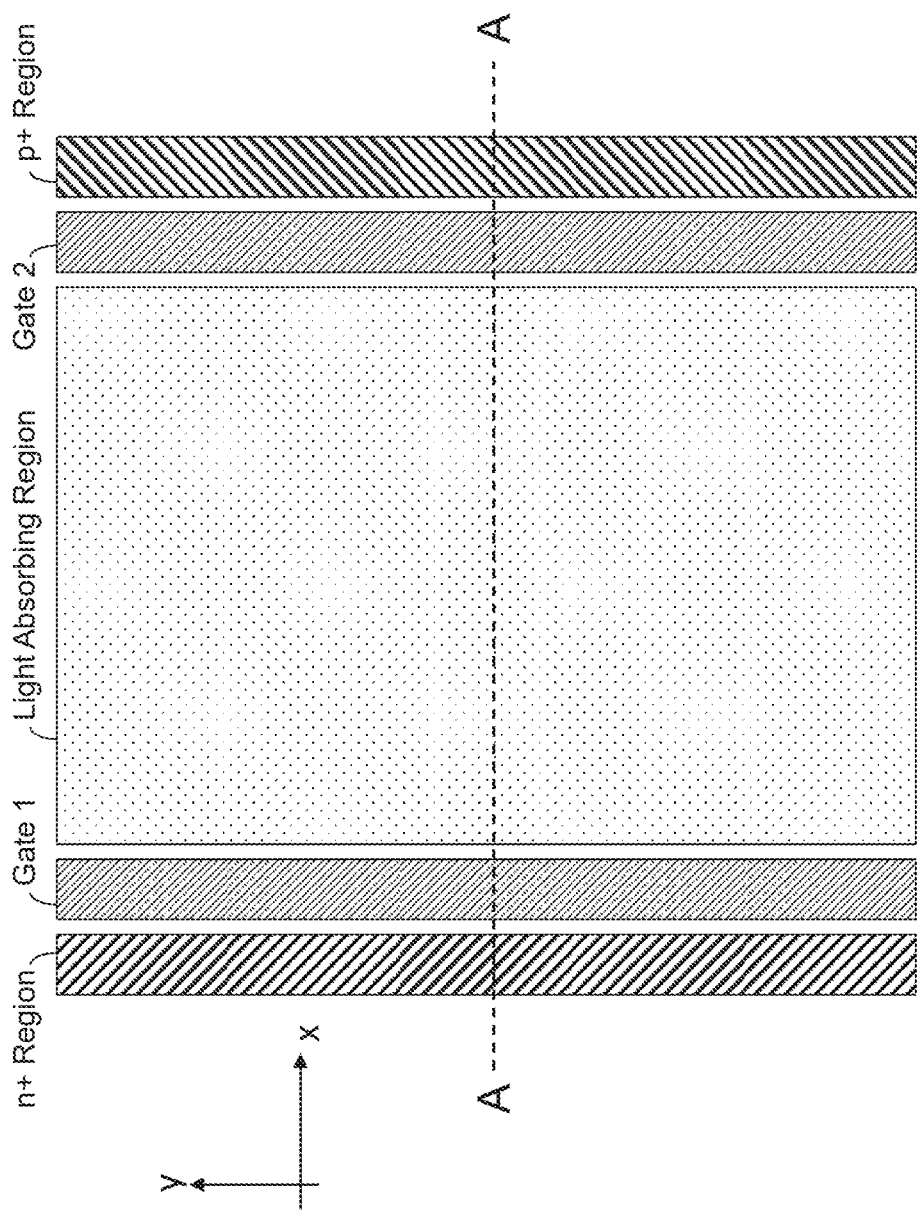
Figure 2A:
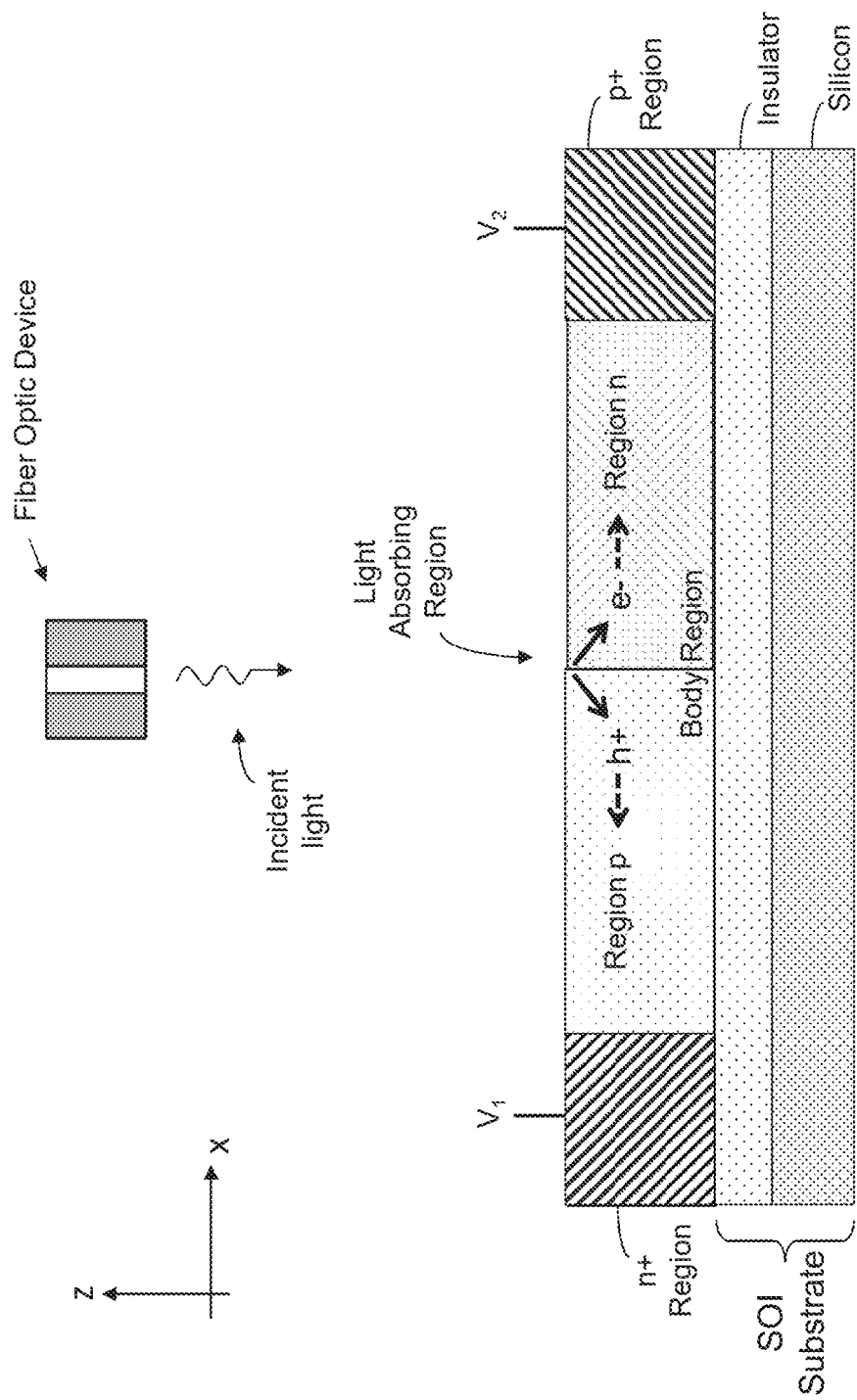
Figure 3A:
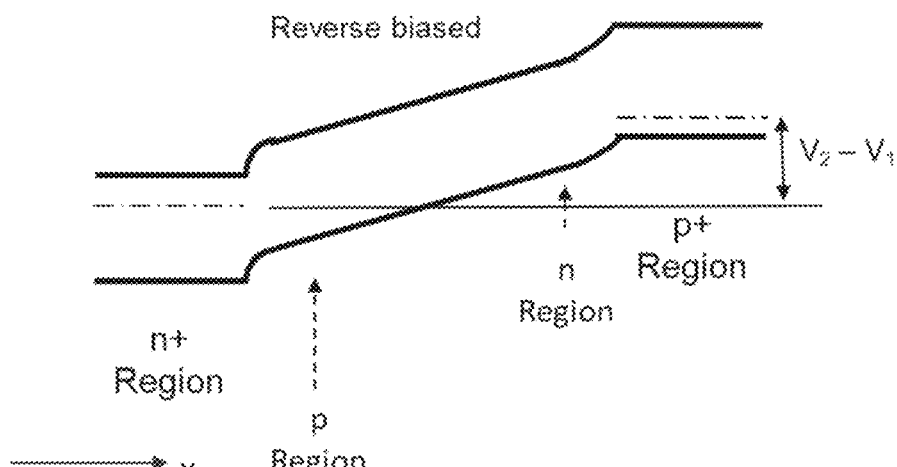
FIGS. 3A, 3B, and 3C are exemplary energy band diagrams corresponding to a photodetector, as disclosed in the '339 application.
Figure 3B:
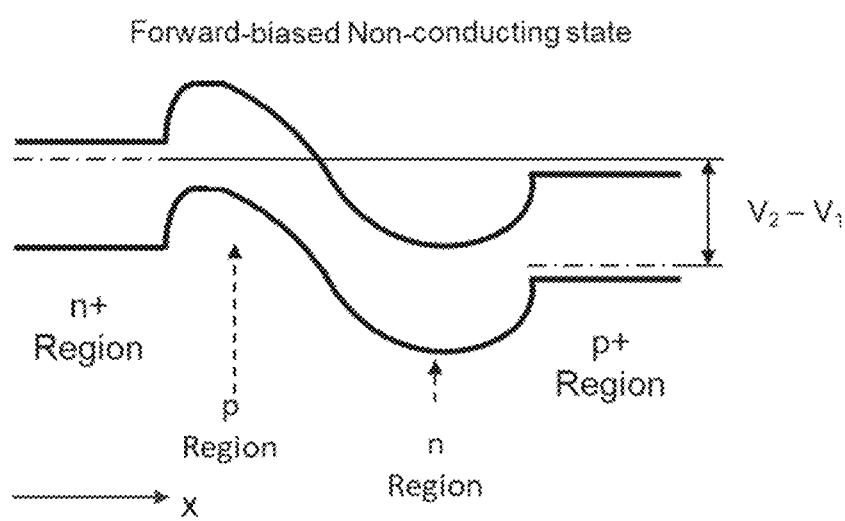
Figure 3C:
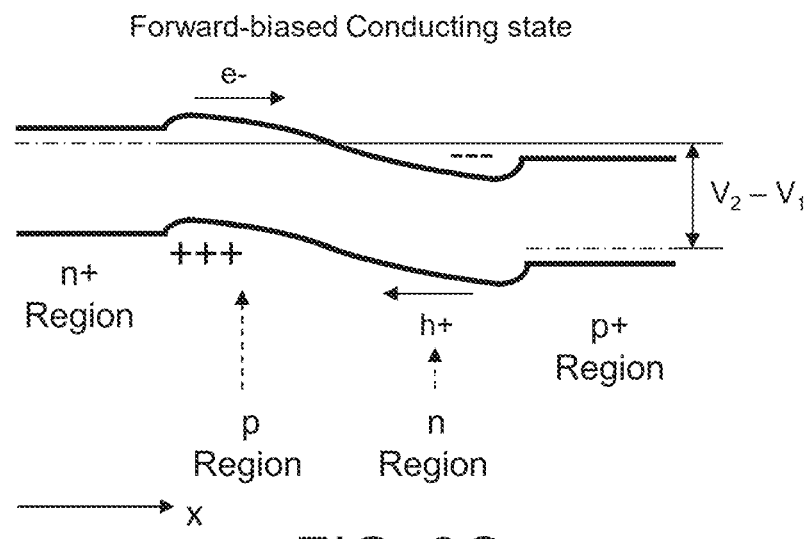
Figure 4:
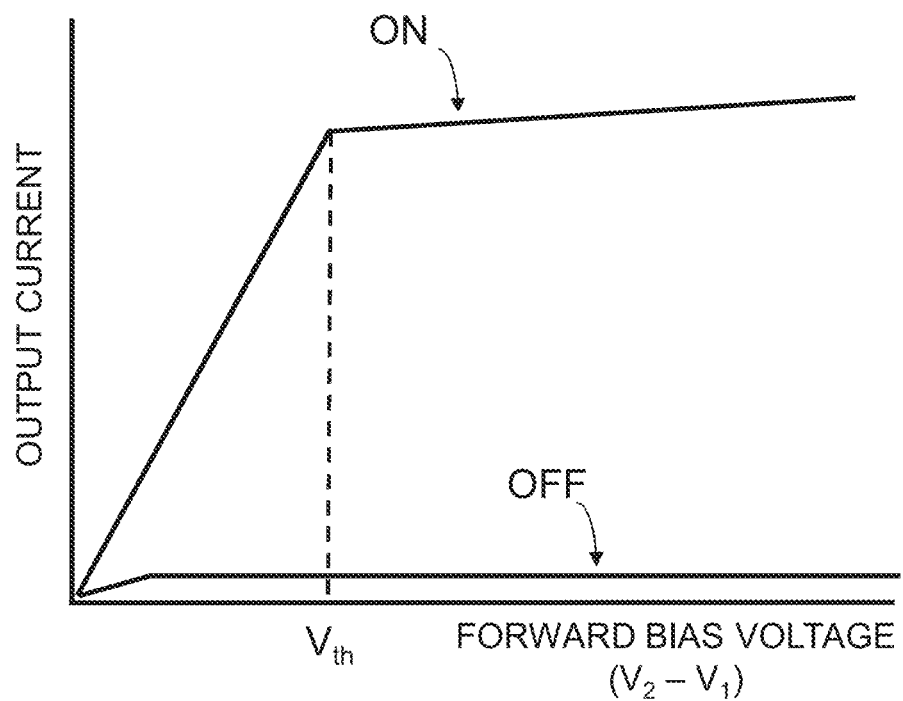
FIG. 4 is a graph of an exemplary output current of a photodetector as a function of bias voltage, as disclosed in the '339 application.
Figure 5A:
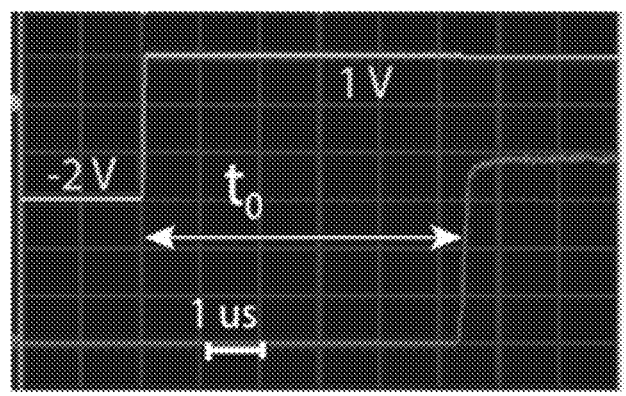
FIGS. 5A and 5B show oscilloscope screen shots of bias voltage and output current of a photodetector, as disclosed in the '339 application.
Figure 5B:
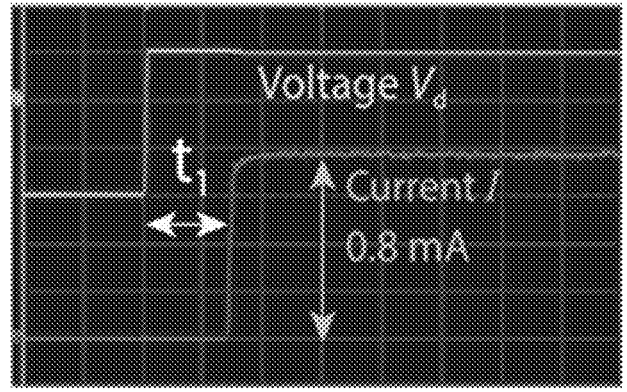

In addition to CMD2_delayed from delay generator 1512, front end 1514 may also receive a bias signal Bias 2 from controller 1502. Bias2 may specify the level of bias voltage or current to be provided to photodetector 1516 in order to place it into the active mode. For example, controller 1502 may control, tune, adjust, and/or program Bias 2 in order to minimize noise on the distance extracted by ToF system 1500 by optimizing the number $N_{tot}$ of electrons needed to generate a photocurrent in the photodetector 1516. Based on CMD2_delayed and Bias2, front end 1514 may provide a driving bias voltage or current to photodetector 1516. Photodetector 1516 may then be forward biased and placed into active mode. Photodetector 1516 may sense incident light 1518 and output a photocurrent, as discussed above with reference to FIGS. 1A and 2A. The photocurrent may be output to front end 1514. Front end 1514 may send a digitized alert signal to TDC 1520 indicating that the photocurrent has been output to front end 1514.

TDC 1520 may measure the time at which it receives CMD2_delayed, and treat this time as the time when the bias voltage or current was provided to photodetector 1516, placing photodetector 1516 into an active state. TDC 1520 may also measure the time at which it receives the alert signal from front end 1514. TDC 1520 may record digital representations of the measured times. TDC 1520 may determine the triggering time $T_{trig}$ by calculating the difference between these two measured times. This calculation may utilize the digital representations of the measured times.

Programmable delay generator 1512 may vary the amount of time to delay CMD2, and provide different times to front end 1514 for a number of iterations. The number of iterations may be a predetermined number, or a variably calculated number. For each iteration, the triggering time $T_{trig}$ may be determined by TDC 1520. Each triggering time $T_{trig}$ may be output to controller 1502 and recorded by controller 1502. Controller 1502 may determine the time for which the triggering time $T_{trig}$ is minimized. This time $T_{trig}(min)$ where $T_{trig}$ is minimized may then be used by controller 1502 to determine the distance L between one or more objects in the environment and the photodetector 1516 using the following equation:

$$L = (T_{trig(min)} \cdot c)/2$$

where c is the speed of light.

Figure 7:
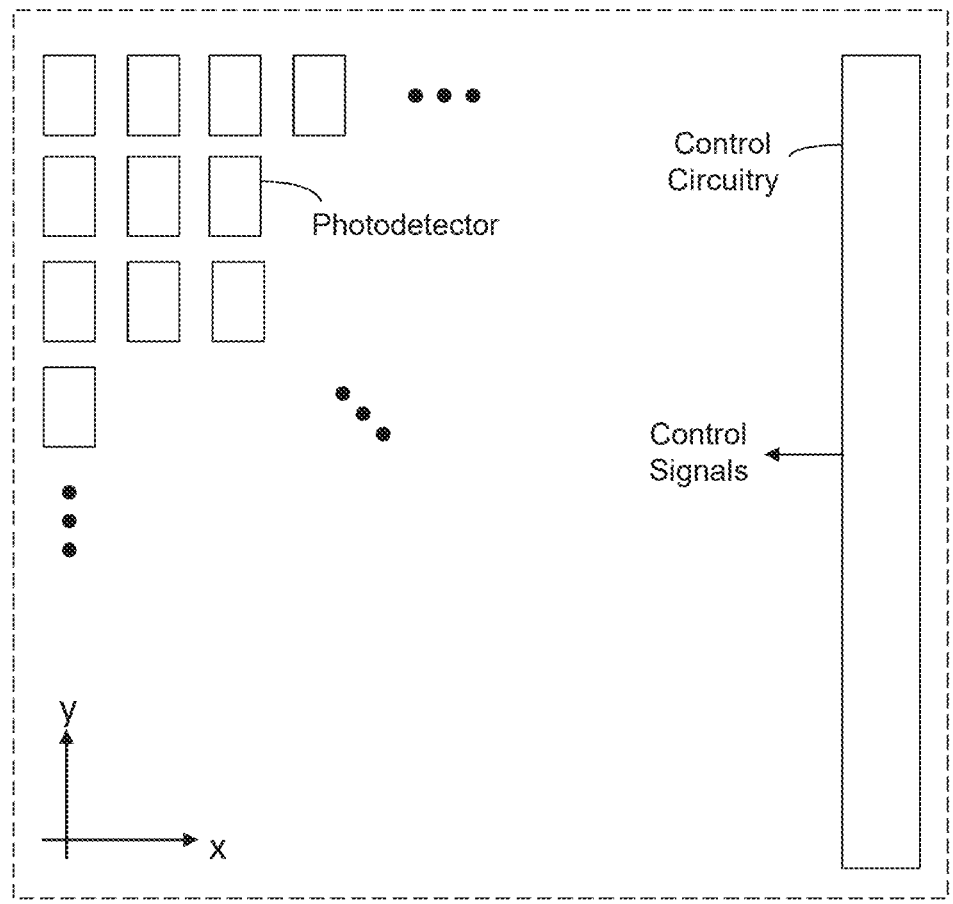
FIG. 7 illustrates a photodetector array comprising a two-dimensional (2D) array of photodetectors as disclosed in the '339 application.
Figure 16:
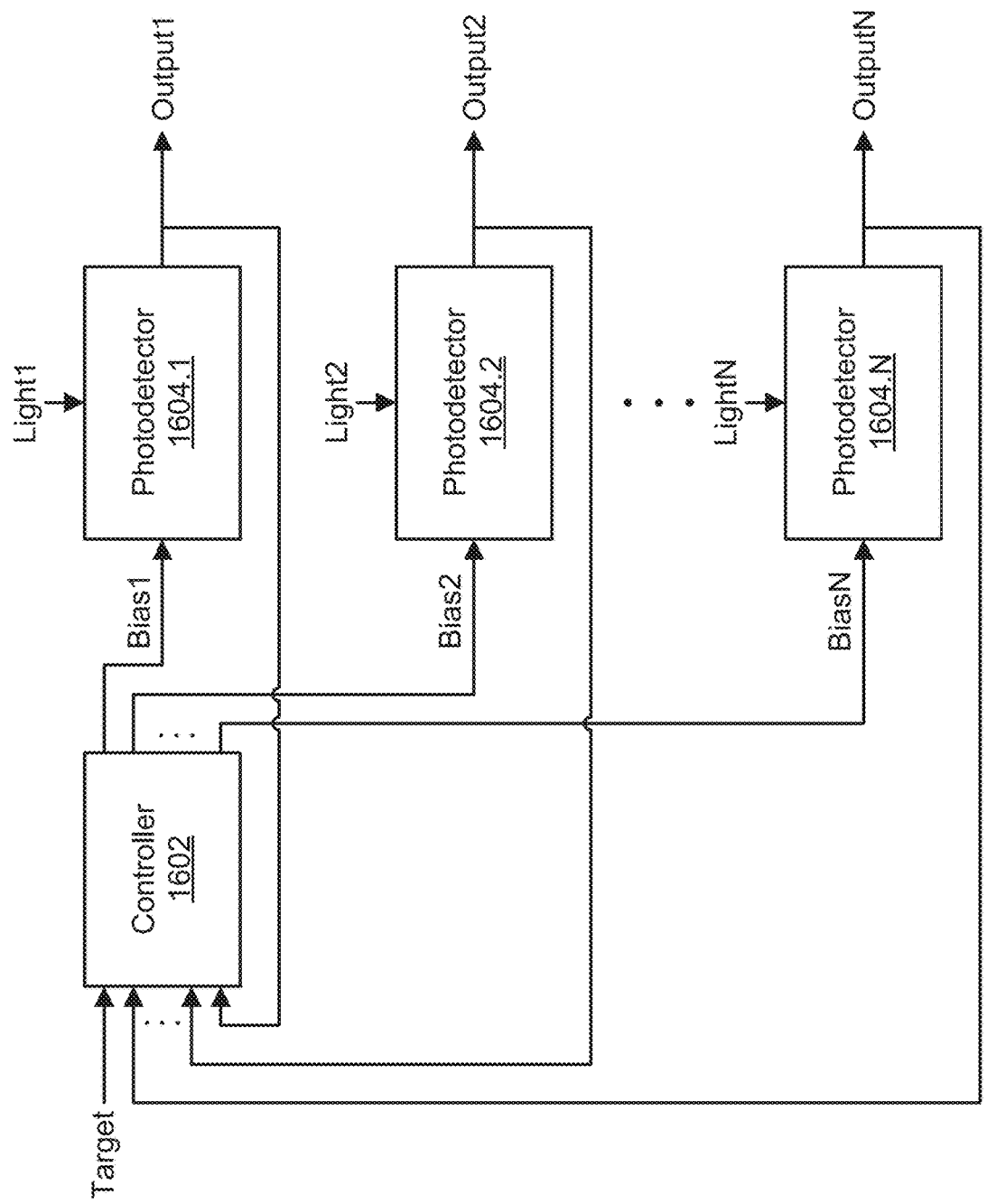
FIG. 16 illustrates a control system architecture for controlling, tuning, adjusting, and/or programming a plurality of parameters corresponding to a plurality of photodetectors, according to an embodiment of the present disclosure.

FIG. 16 illustrates a control system architecture 1600 for controlling, tuning, adjusting, and/or programming a plurality of parameters corresponding to a plurality of photodetectors (e.g., the array of photodetectors in FIG. 7), according to an embodiment of the present disclosure. Control system architecture 1600 may include a controller 1602 and a plurality of photodetectors 1604.1-1604.N. Controller 1602 may be formed by one or more microcontrollers, processors, or microprocessors. Controller 1602 may include one or more memory devices such as DRAM, SRAM, flash memory, a magnetic disk drive, an optical drive, a PROM, a ROM, or any other memory and combination of memories. The one or more microcontrollers, processors, or microprocessors may implement algorithms, instructions, and/or programs that are stored on the one or more of the memory devices in order to perform the various processes of the present disclosure. Controller 1602 may send and receive various signals to and from the plurality of photodetectors 1604.1-1604.N. Each of the plurality of photodetectors 1604.1-1604.N may be any photodetector, including any of the photodetectors disclosed in the '960 patent and the '339 application.

Controller 1602 may receive, as inputs, a target and a plurality of outputs Output1-OutputN, each corresponding to a characteristic of the photodetectors 1604.1-1604.N. Output1-OutputN may be measured directly from photodetectors 1604.1-1604.N or from other parameters of photodetectors 1604.1-1604.N. Alternatively, Output1-OutputN may be calculated based on other parameters of photodetectors 1604.1-1604.N. Based on the target and Output1-OutputN, controller 1602 may generate (or compute or formulate) and output a plurality of bias signals Bias1-BiasN, each to a corresponding photodetector of the plurality of photodetectors 1604.1-1604.N. Each of bias signals Bias1-BiasN may be a voltage, a current, or a signal to a driver (not shown) that in turn forward biases a corresponding photodetector among photodetectors 1604.1-1604.N.

The target may be an N-by-N matrix of target coefficients (f11-fNN) that controller 1602 may use to operate on Output1-OutputN to formulate Bias1-BiasN, as follows:

$$\begin{bmatrix} f11 & \cdots & f1N \\ \vdots & \ddots & \vdots \\ fN1 & \cdots & fNN \end{bmatrix} \begin{bmatrix} Output1 \\ \vdots \\ OutputN \end{bmatrix} = \begin{bmatrix} Bias1 \\ \vdots \\ BiasN \end{bmatrix}$$

It should be appreciated, from the above equation, that controller 1602 may be configured to formulate each of the bias signals Bias1-BiasN as a combination of the outputs Output1-OutputN. The N-by-N target matrix may be predetermined and fixed by an operator of the control system. Alternatively, the target matrix may be dynamically and/or automatically varied during the operation of photodetectors 1604.1-1604.N. The target matrix may be based on values at which parameters of photodetectors 1604.1-1604.N may be desired to be set at a given moment in time. In some embodiments, the target matrix may be set independently of the light conditions (e.g., light intensities Light1-LightN) under which photodetectors 1604.1-1604.N operate.

Bias signals Bias1-BiasN may forward bias a corresponding photodetector among photodetectors 1604.1-1604.N. Controller 1602 may, continuously or at predetermined time intervals, vary bias signals Bias1-BiasN such that and until the selected parameters of photodetectors 1604.1-1604.N reach the target. As discussed above, examples of parameters of a photodetector that may be controlled, tuned, adjusted, and/or programmed are, but are not limited to, triggering time, SNR, and contrast level (e.g., in time-of-flight (ToF) systems, proximity or gesture sensors, vital sign monitors, etc.). Depending on which parameter is being controlled, tuned, adjusted, and/or programmed, controller 1602 may embody a plurality of SNR calculators, a plurality of ToF extractors, etc.

Figure 17:
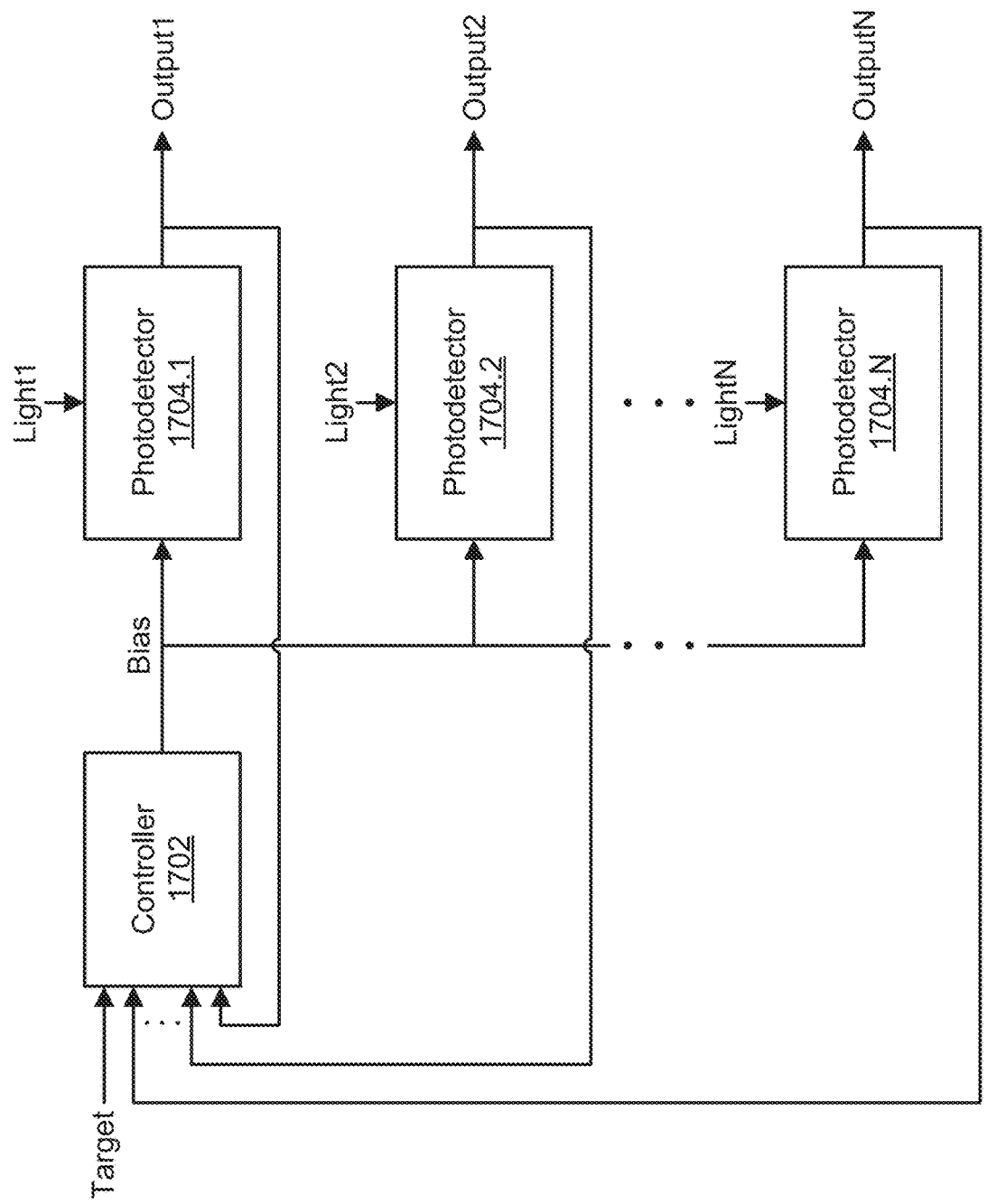
FIG. 17 illustrates a control system architecture for controlling, tuning, adjusting, and/or programming a plurality of parameters corresponding to a plurality of photodetectors, according to an embodiment of the present disclosure.

FIG. 17 illustrates a control system architecture 1700 for controlling, tuning, adjusting, and/or programming a plurality of parameters corresponding to a plurality of photodetectors (e.g., the array of photodetectors in FIG. 7), according to an embodiment of the present disclosure. Control system architecture 1700 may include a controller 1702 and a plurality of photodetectors 1704.1-1704.N. Controller 1702 may be formed by one or more microcontrollers, processors, or microprocessors. Controller 1702 may include one or more memory devices such as DRAM, SRAM, flash memory, a magnetic disk drive, an optical drive, a PROM, a ROM, or any other memory and combination of memories. The one or more microcontrollers, processors, or microprocessors may implement algorithms, instructions, and/or programs that are stored on the one or more of the memory devices in order to perform the various processes of the present disclosure. Controller 1702 may send and receive various signals to and from the plurality of photodetectors 1704.1-1704.N. Each of the plurality of photodetectors 1704.1-1704.N may be any photodetector, including any of the photodetectors disclosed in the '960 patent and the '339 application.

Controller 1702 may receive, as inputs, a target and a plurality of outputs Output1-OutputN, each corresponding to a characteristic of photodetectors 1704.1-1704.N. Output1-OutputN may be measured directly from photodetectors 1704.1-1704.N or from other parameters of photodetectors 1704.1-1704.N. Alternatively, Output1-OutputN may be calculated based on other parameters of photodetectors 1704.1-1704.N. Based on the target and Output1-OutputN, controller 1702 may generate (or compute or formulate) and output a bias signal Bias to each of photodetectors 1704.1-1704.N. The bias signal Bias may be a voltage, a current, or a signal to a driver (not shown) that in turn forward biases photodetectors 1704.1-1704.N.

The target may be an 1-by-N vector of target coefficients (f11-f1N) that controller 1702 may use to operate on Output1-OutputN to formulate bias signal Bias, as follows:

$$[f11 \ \ldots \ f1N] \begin{bmatrix} Output1 \\ \vdots \\ OutputN \end{bmatrix} = \text{Bias}$$

It should be appreciated, from the above equation, that controller 1702 may formulate bias signal Bias based on a combination of the outputs Output1-OutputN. The target vector may be predetermined and fixed by an operator of the control system. Alternatively, the target vector may be dynamically and/or automatically varied during the operation of photodetectors 1704.1-1704.N. The target vector may be based on values at which parameters of photodetectors 1704.1-1704.N may be desired to be set at a given moment in time. In some embodiments, the target vector may be set independently of the light conditions (e.g., light intensities Light1-LightN) under which photodetectors 1704.1-1704.N operate.

The bias signal Bias may forward bias the photodetectors 1704.1-1704.N. Controller 1702 may, continuously or at predetermined time intervals, vary bias signal Bias such that and until the selected parameters of photodetectors 1704.1-1704.N reach the target. As discussed above, examples of parameters of a photodetector that may be controlled, tuned, adjusted, and/or programmed are, but are not limited to, triggering time, SNR, and contrast level (e.g., in time-of-flight (ToF) systems, proximity or gesture sensors, vital sign monitors, etc.). Depending on which parameter is being controlled, tuned, adjusted, and/or programmed, controller 1702 may embody a plurality of SNR calculators, a plurality of ToF extractors, etc.

While certain embodiments, features, attributes and advantages of the present disclosure have been described and illustrated, it should be understood that many others, as well as different and/or similar embodiments, features, attributes and advantages of the present disclosure, are apparent from the description and illustrations. As such, the above embodiments of the present disclosure are merely exemplary. They are not intended to be exhaustive or to limit the present disclosure to the precise forms, techniques, materials and/or configurations disclosed. Many modifications and variations are possible in light of this disclosure. It should be understood that other embodiments may be utilized and operational changes may be made without departing from the scope of the present disclosure. As such, the scope of the present disclosure should not be limited solely to the description above because the description of the above embodiments has been presented for the purposes of illustration and description.

Importantly, the present disclosure is neither limited to any single aspect nor embodiment, nor to any combinations and/or permutations of such aspects and/or embodiments. Moreover, each of the aspects of the present disclosure, and/or embodiments thereof, may be employed alone or in combination with one or more of the other aspects and/or embodiments thereof. For the sake of brevity, many of those permutations and combinations will not be discussed and/or illustrated separately herein.

The exemplary voltage levels to implement or enable sensing by a photodetector are merely exemplary. The indicated voltage levels may be relative or absolute. Alternatively, the voltages indicated may be relative in that each voltage level, for example, may be increased or decreased by a given voltage amount (for example, each voltage may be increased or decreased by 0.1, 0.15, 0.25, 0.5, 1 volt) whether one or more of the voltages (for example, the voltages applied to n+ region and p+ region) may become or may be positive and negative.

It should be noted that the term "circuit" may mean, among other things, a single component or a multiplicity of components (whether in integrated circuit form or otherwise), which may be active and/or passive, and which may be coupled together to provide or perform a desired function. The term "circuitry" may mean, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" may mean, among other things, a current or voltage signal(s) whether in an analog or a digital form, which may be a single bit (or the like) or multiple bits (or the like).

Notably, reference herein to "one embodiment" or "an embodiment" herein means that a particular feature, structure, or characteristic described in connection with the embodiment can be included in one some or all of the embodiments of the present disclosure. The usages or appearances of the phrase "in one embodiment" or "in another embodiment" in the specification are not referring to the same embodiment, nor are separate or alternative embodiments necessarily mutually exclusive of one or more other embodiments. The same applies to the term "implementation."

Further, an embodiment or implementation described herein as exemplary should not to be construed as preferred or advantageous, for example, over other embodiments or implementations; rather, it is intended to reflect or indicate the embodiment or embodiments as an example embodiment(s).

The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

It should be further noted that the various circuits and circuitry disclosed herein may be described using computer aided design tools and expressed (or represented), as data and/or instructions embodied in various computer-readable media, for example, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). The present disclosure may also be directed to such representation of the circuitry described herein, and/or techniques implemented thereby, and, as such, are intended to fall within the scope of the present disclosure.

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that may be used to form various components of the circuits in a device fabrication process.

Moreover, the various circuits and circuitry, as well as techniques, disclosed herein may be represented via simulations and simulation instruction-based expressions using computer aided design, simulation and/or testing tools. The simulation of the circuitry of the present disclosure, including the photodetector and/or techniques implemented thereby, may be implemented by a computer system wherein characteristics and operations of such circuitry, and techniques implemented thereby, may be simulated, imitated, replicated, analyzed and/or predicted via a computer system. The present disclosure may also be directed to such simulations and testing of the disclosed device and/or circuitry, and/or techniques implemented thereby, and, as such, are intended to fall within the scope of the present disclosure. The computer-readable media and data corresponding to such simulations and/or testing tools are also intended to fall within the scope of the present disclosure.

In the claims, the term "determine" and "calculate" and other forms thereof (i.e., determining, determined and the like or calculating, calculated and the like) means, among other things, calculate, assesses, determine and/or estimate and other forms thereof.

In addition, the terms "first," "second," and the like, herein do not denote any order, quantity, or importance, but rather are used to distinguish one element from another. Moreover, the terms "a" and "an" herein do not denote a limitation of quantity, but rather denote the presence of at least one of the referenced items. Further, the term "data" may mean, among other things, a current or voltage signal(s) whether in analog or a digital form (which may be a single bit (or the like) or multiple bits (or the like)).

As used in the claims, the terms "comprises," "comprising," "includes," "including," "have," and "having" or any other variation thereof, are intended to cover a non-exclusive inclusion, such that a process, method, article, or apparatus that comprises a list of elements does not include only those elements but may include other elements not expressly listed or inherent to such process, method, article, or apparatus.

Further, the statement that one or more circuits, circuitry, nodes and/or components are "coupled" means that the circuits, circuitry, nodes and/or components may be joined and/or operate (for example, physically or electrically) together either directly or indirectly, i.e., through one or more intermediate circuits, circuitry, nodes and/or components, so long as a link occurs; "directly coupled" means that two elements may be directly joined, in contact and/or operate with each other.

The invention claimed is:

1. A system for controlling a photodetector, the system comprising:
    one or more processors; and
    memory storing instructions that, when executed by the one or more processors, cause the system to:
        receive a target value;
        receive an output from the photodetector;
        generate, based at least on the target value, a bias signal; and
        apply the bias signal to the photodetector to drive a parameter of the photodetector to the target value.

2. The system of claim 1, wherein the instructions, when executed by the one or more processors, further cause the system to:
    calculate, based on the output, a signal-to-noise ratio associated with the photodetector; and
    generate the bias signal based at least on the target value and the signal-to-noise ratio.

3. The system of claim 1, wherein the instructions, when executed by the one or more processors, further cause the system to:
    calculate, based on the output, a signal-to-noise ratio associated with the photodetector; and
    generate the bias signal based at least on the target value, the output, and the signal-to-noise ratio.

4. The system of claim 3, wherein the instructions, when executed by the one or more processors, further cause the system to:
    calculate, based on the output, a distance of an object from the photodetector; and
    generate the bias signal based at least on the target value, the output, the signal-to-noise ratio, and the distance.

5. The system of claim 4, wherein the instructions, when executed by the one or more processors, further cause the system to:
    receive a power level of a light source, wherein:
        the light source is configured to emit a pulse of light, and
        the photodetector is configured to detect a reflection of the pulse of light; and
    generate the bias signal based at least on the target value, the output, the signal-to-noise ratio, the distance, and the power level.

6. The system of claim 1, wherein the output is a triggering time of the photodetector.

7. The system of claim 1, wherein the parameter is one of a triggering time, a signal-to-noise ratio, or a contrast level.

8. A method for controlling a photodetector, the method comprising:
    receiving, by a system comprising memory and one or more processors, a target value;
    receiving, by the system, an output from the photodetector;

generating, by the system and based at least on the target value, a bias signal; and applying, by the system, the bias signal to the photodetector to drive a parameter of the photodetector to the target value.

9. The method of claim 8, further comprising:

calculating, by the system and based on the output, a signal-to-noise ratio associated with the photodetector; and generating, by the system and based at least on the target value and the signal-to-noise ratio, the bias signal.

10. The method of claim 8, further comprising:

calculating, by the system and based on the output, a signal-to-noise ratio associated with the photodetector; and generating, by the system and based at least on the target value, the output, and the signal-to-noise ratio, the bias signal.

11. The method of claim 10, further comprising:

calculating, by the system and based on the output, a distance of an object from the photodetector; and generating, by the system and based at least on the target value, the output, the signal-to-noise ratio, and the distance, the bias signal.

12. The method of claim 11, further comprising:

receiving, by the system, a power level of a light source, wherein:

the light source is configured to emit a pulse of light, and the photodetector is configured to detect a reflection of the pulse of light; and generating, by the system and based at least on the target value, the output, the signal-to-noise ratio, the distance, and the power level, the bias signal.

13. The method of claim 8, wherein the output is a triggering time of the photodetector.

14. The method of claim 8, wherein the parameter is one of a triggering time, a signal-to-noise ratio, or a contrast level.

15. One or more non-transitory computer-readable media storing executable instructions that, when executed by one or more processors, cause a system to:

receive a target value;

receive an output from a photodetector;

generate, based at least on the target value, a bias signal; and apply the bias signal to the photodetector to drive a parameter of the photodetector to the target value.

16. The one or more non-transitory computer-readable media of claim 15, wherein the executable instructions, when executed by the one or more processors, further cause the system to:

calculate, based on the output, a signal-to-noise ratio associated with the photodetector; and generate the bias signal based at least on the target value and the signal-to-noise ratio.

17. The one or more non-transitory computer-readable media of claim 15, wherein the executable instructions, when executed by the one or more processors, further cause the system to:

calculate, based on the output, a signal-to-noise ratio associated with the photodetector; and generate the bias signal based at least on the target value, the output, and the signal-to-noise ratio.

18. The one or more non-transitory computer-readable media of claim 17, wherein the executable instructions, when executed by the one or more processors, further cause the system to:

calculate, based on the output, a distance of an object from the photodetector; and generate the bias signal based at least on the target value, the output, the signal-to-noise ratio, and the distance.

19. The one or more non-transitory computer-readable media of claim 18, wherein the executable instructions, when executed by the one or more processors, further cause the system to:

receive a power level of a light source, wherein:

the light source is configured to emit a pulse of light, and the photodetector is configured to detect a reflection of the pulse of light; and generate the bias signal based at least on the target value, the output, the signal-to-noise ratio, the distance, and the power level.

20. The one or more non-transitory computer-readable media of claim 15, wherein the output is a triggering time of the photodetector.

21. The one or more non-transitory computer-readable media of claim 15, wherein the parameter is one of a triggering time, a signal-to-noise ratio, or a contrast level.

22. A system for controlling a plurality of photodetectors, the system comprising:

one or more processors; and memory storing instructions that, when executed by the one or more processors, cause the system to:

receive a matrix of target coefficients;

receive a plurality of outputs, each from a photodetector of the plurality of photodetectors;

generate, based at least on the matrix of target coefficients and the plurality of outputs, a plurality of bias signals; and apply each of the plurality of bias signals to a corresponding photodetector of the plurality of photodetectors to drive a parameter of the corresponding photodetector to a target value.

23. A system for controlling a plurality of photodetectors, the system comprising:

one or more processors; and memory storing instructions that, when executed by the one or more processors, cause the system to:

receive a vector of target coefficients;

receive a plurality of outputs, each from a photodetector of the plurality of photodetectors;

generate, based at least on the vector of target coefficients and the plurality of outputs, a bias signal; and apply the bias signal to each of the plurality of photodetectors to drive a parameter of each of the plurality of photodetectors to a target value.

* * * * *